(12) United States Patent
Morinaga et al.

(10) Patent No.: US 7,546,764 B2
(45) Date of Patent: Jun. 16, 2009

(54) ESTIMATION METHOD AND APPARATUS OF TIRE DYNAMIC STATE AMOUNT AND TIRE WITH SENSORS

(75) Inventors: Hiroshi Morinaga, Tokyo (JP); Yasumichi Wakao, Tokyo (JP); Akira Kobayakawa, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 77 days.

(21) Appl. No.: 11/628,299

(22) PCT Filed: Jun. 2, 2005

(86) PCT No.: PCT/JP2005/010132

§ 371 (c)(1),
(2), (4) Date: Dec. 20, 2006

(87) PCT Pub. No.: WO2005/118317

PCT Pub. Date: Dec. 15, 2005

(65) Prior Publication Data
US 2007/0240502 A1 Oct. 18, 2007

(30) Foreign Application Priority Data
Jun. 2, 2004 (JP) .............................. 2004-164546

(51) Int. Cl.
*E01C 23/00* (2006.01)

(52) U.S. Cl. ...................................... 73/146

(58) Field of Classification Search .................. 73/146, 73/146.2, 146.4, 146.5
See application file for complete search history.

(56) References Cited

U.S. PATENT DOCUMENTS

| 4,097,723 | A | * | 6/1978 | Leitner et al. ................ 219/494 |
| 5,670,872 | A | * | 9/1997 | Van De Walle et al. ..... 324/171 |
| 6,539,295 | B1 | | 3/2003 | Katzen et al. |

(Continued)

FOREIGN PATENT DOCUMENTS

EP 1657082 A1 5/2006

(Continued)

*Primary Examiner*—Jewel Thompson
(74) *Attorney, Agent, or Firm*—Sughrue Mion, PLLC

(57) ABSTRACT

The dynamic state amount of a tire when a load is applied to the tire while running can be estimated accurately and stably by installing tire deformation amount measuring means 11A and 11B at axisymmetrical positions which are equally distant in the axial direction from the center in the axial direction of the tire on the cross-section in the radial direction of the tire on the inner side of the belt portion of a tire tread in the radial direction, such as at the inner surface of the tread, between an inner liner and a ply, between plies or between a ply and a belt to measure the waveforms of deformation of the tire, detecting the contact time which is the time difference between contact edges from the waveforms of deformation, calculating contact length indices $k_A$ and $k_B$ from the contact time and the wheel speed detected by a wheel speed sensor 15, calculating the average value k of the above indices $k_A$ and $k_B$, and obtaining a load applied to the tire by using the calculated average value k of the indices of contact length and a map 18M showing the relationship between the average value of the indices of contact length and load pre-stored in memory means 18.

58 Claims, 14 Drawing Sheets

U.S. PATENT DOCUMENTS

| | | | |
|---|---|---|---|
| 6,550,320 B1 * | 4/2003 | Giustino | 73/146 |
| 6,959,592 B2 * | 11/2005 | Caretta | 73/146 |
| 7,000,462 B2 * | 2/2006 | Hillenmayer et al. | 73/146.5 |
| 7,146,853 B2 * | 12/2006 | Fischer et al. | 73/146 |

FOREIGN PATENT DOCUMENTS

| | | |
|---|---|---|
| JP | 9-188113 A | 7/1997 |
| JP | 2003-65871 A | 3/2003 |
| JP | 2004-317443 A | 11/2004 |
| JP | 2004-359203 A | 12/2004 |
| JP | 2005-88832 A | 4/2005 |
| JP | 2005-164337 A | 6/2005 |
| JP | 2005-170222 A | 6/2005 |

* cited by examiner

RUNNING STRAIGHT

PROVIDING SLIP ANGLE

RUNNING AT STEADY STATE

WHILE ACCELERATING

ESTIMATION METHOD AND APPARATUS OF TIRE DYNAMIC STATE AMOUNT AND TIRE WITH SENSORS

BACKGROUND OF THE INVENTION

1. Field of the Invention

The present invention relates to a method and apparatus for estimating the dynamic state amount of a tire when a load or lateral force is applied to the tire and a tire with sensors at the inner liner portion of a tire tread for measuring the amount of deformation of the tire while running.

2. Description of the Prior Art

To enhance the running stability of an automobile, it is desired that force (tire generation force) generated in the tire such as a load, lateral force or longitudinal force should be estimated accurately and fed back to the control system of the automobile. It is considered that higher level of control of an ABS brake or a body attitude controller making use of this would become possible with this information, thereby further improving safety.

As means of estimating force generated in a tire by using the tire like a sensor in the prior art, there is proposed a method in which a tire side portion is magnetized and the twisting degree of the above tire side portion is measured with magnetic sensors installed outside the tire to estimate the longitudinal force of the tire, or lateral force generated in the tire is estimated from the size of the detection output of the above magnetic sensors, making use of the fact that the whole belt ring is deformed when lateral force is applied to the tire (refer to patent document 1, for example).

Meanwhile, there is disclosed a technology for estimating the dynamic state of a tire by comparing a measurement waveform profile by installing a plurality of acceleration sensors on the inner side of a tread on the same cross-section of the tire (refer to patent documents 2 and 3, for example).

Patent document 1: WO 01/092078
Patent document 2: WO 03/082643
Patent document 3: WO 03/082644

SUMMARY OF THE INVENTION

However, the method making use of magnetic sensors has a problem with the measurement accuracy of lateral force because the gain is small though the longitudinal force of the tire can be measured accurately. Also, since the distance between the magnetic sensors and the tire changes by vibration, it is considered detected magnetic force varies and the estimation accuracy of lateral force becomes lower.

Meanwhile, in the method of estimating the dynamic behavior of a tire with acceleration sensors, since the output waveform of each acceleration sensor depends on speed, particularly when a vehicle runs at a low speed, the peak gain of the contact patch becomes small and it is difficult to detect the contact length itself. Further, when the acceleration sensors are used, on a rough road or a wet road having a certain depth of water, a peak is generated from a portion other than a leading edge which is a portion getting into the contact patch or a trailing edge which is an escaping portion, thereby making it difficult to capture the peak at the leading edge or the trailing edge with the result that the contact length can not be detected accurately.

The inventors of the present invention have confirmed that when the tire has a camber angle with respect to the road surface, lateral force greatly changes even with the same contact shape. Since it is difficult to detect information other than the contact patch in the above method using acceleration sensors, it is difficult to correct an estimation error for this camber angle.

It is an object of the present invention which has been made in view of the problem of the prior art to provide a method and apparatus for estimating accurately and stably the dynamic state amount of a tire such as a load applied to the tire, or lateral force or longitudinal force generated in the tire, representing the dynamic state of the tire when a load, lateral force or longitudinal force is applied to the tire while running, and a tire with sensors for use in the method and apparatus.

The inventors of the present invention have conducted intensive studies and have found that a waveform obtained by measuring the deformation amount of a portion in the radial direction, which is deformed by an input into the tire tread from the road surface of a tire rubber portion on the inner surface in the radial direction of the belt portion of a tire tread on the inner surface of an inner liner portion, between the inner liner and a ply, between plies, between a ply and a belt represents the deformation of the tire itself and that the amount of deformation rarely changes by speed. A sensor such as a strain sensor for measuring the deformation amount of a tire rubber portion on the inner side of the tread such as the above inner liner portion is installed on the inner liner portion to measure the above deformation amount, thereby making it possible to detect information on the contact patch of the tire and portions before and after the contact patch accurately. The inventors have found that even when longitudinal force or lateral force is input, a load applied to the tire can be estimated stably by measuring the above deformation amount at two or more sites. The present invention has been accomplished based on this finding.

When a change in the contact shape of the tire is measured in terms of "contact length ratio" or "contact length difference", not only lateral force can be estimated accurately but also longitudinal force can be estimated accurately as the longitudinal shift of the contact patch caused by longitudinal force is taken as the amount of deformation before and after the contact patch.

That is, according to a first aspect of the present invention, there is provided a method of estimating the dynamic state amount of a tire when one or more of a load, lateral force and longitudinal force are generated in the tire while running by measuring the amount of deformation at two or more positions on the inner side of the belt portion of a tire tread in the radial direction, which are on almost the same cross-section in the radial direction of the tire, and a wheel speed.

The above measurement points on almost the same cross-section are considered such that the angle between two planes including the center axis of the tire and the above measurement points are several degrees or less and the tread, contact and kick of the tire occur almost at the same time.

According to a second aspect of the present invention, there is provided a method of estimating the dynamic state amount of a tire according to claim 1, wherein the amount of deformation is any one of the amount of deformation at the inner surface of an inner portion, amount of deformation between the inner liner and a ply, amount of deformation between plies or amount of deformation between the ply and a belt.

According to a third aspect of the present invention, there is provided the method of estimating the dynamic state amount of a tire according to claim 1 or 2, wherein the amount of deformation is strain in the circumferential direction of the tire, or a change amount of strain in the circumferential direction, or out-of-plane bending strain of a tread portion in the circumferential direction or shear strain.

According to a fourth aspect of the present invention, there is provided the method of estimating the dynamic state amount of a tire according to claim 1 or 2, wherein the amount of deformation is strain in the lateral direction of the tire, a change amount of strain in the lateral direction, bending strain of the tread portion in the lateral direction or shear strain.

According to a fifth aspect of the present invention, there is provided The method of estimating the dynamic state amount of a tire according to any one of claims 1 to 4, wherein the contact length or deformation length of the tire is calculated from the amount of deformation, and the dynamic state amount of the tire is estimated based on the calculated contact length or deformation length.

According to a sixth aspect of the present invention, there is provided The method of estimating the dynamic state amount of a tire according to claim 5, wherein the dynamic state amount for estimating the dynamic state of the tire is a load applied to the tire.

According to a seventh aspect of the present invention, there is provided the method of estimating the dynamic state amount of a tire according to claim 6, wherein the contact time of the tire is detected from the temporal waveform of the amount of deformation at two or more positions, or the temporal waveform of a differential value obtained by time differentiating the amount of deformation, or the temporal waveform of an integrated value obtained by time integrating the amount of deformation, the indices of contact length are calculated by multiplying the detected contact time by the wheel speed, and a load applied to the tire is estimated by the average value of the indices of contact length.

According to an eighth aspect of the present invention, there is provided the method of estimating the dynamic state amount of a tire according to claim 6, wherein the time between deformation points outside the contact patch of the tire is detected from the temporal waveform of the amount of deformation at two or more positions, or the temporal waveform of a differential value obtained by time differentiating the amount of deformation, or the temporal waveform of an integrated value obtained by time integrating the amount of deformation, the indices of deformation length outside the contact patch are calculated by multiplying the detected time between deformation points outside the contact patch by the wheel speed, and a load applied to the tire is estimate by the average value of the indices of deformation length outside the contact patch.

According to a ninth aspect of the present invention, there is provided a method of estimating the dynamic state amount of a tire, wherein the positions for measuring the amount of deformation include at least two axisymmetrical positions which are equally distant in the axial direction from the center in the axial direction of the tire on almost the same cross-section in the radial direction of the tire.

According to a tenth aspect of the present invention, there is provided a method of estimating the dynamic state amount of a tire, wherein the contact time of the tire is detected from the temporal waveform of the amount of deformation at axisymmetrical positions which are equally distant in the axial direction from the center in the axial direction of the tire on almost the same cross-section in the radial direction of the tire, or the temporal waveform of a differential value obtained by time differentiating the amount of deformation, or the temporal waveform of an integrated value obtained by time integrating the amount of deformation, the indices of tire contact length are calculated by multiplying the detected contact time by the wheel speed, the time between deformation points outside the contact patch of the tire is detected from any one of the temporal waveforms, the indices of deformation length outside the contact patch are calculated by multiplying the time between deformation points outside the contact patch by the wheel speed, and the posture angle of the tire is estimated from the indices of contact length and the indices of deformation length outside the contact patch.

According to an eleventh aspect of the present invention, there is provided a method of estimating the dynamic state amount of a tire, wherein the dynamic state amount for estimating the dynamic state of the tire is lateral force generated in the tire.

According to a twelfth aspect of the present invention, there is provided a method of estimating the dynamic state amount of a tire, wherein the contact time of the tire is detected from the temporal waveform of the amount of deformation at axisymmetrical positions which are equally distant in the axial direction from the center in the axial direction of the tire on almost the same cross-section in the radial direction of the tire, or the temporal waveform of a differential value obtained by time differentiating the amount of deformation or the temporal waveform of an integrated value obtained by time integrating the amount of deformation, the indices of tire contact length are calculated by multiplying the detected contact time by the wheel speed, and lateral force generated in the tire is estimated from the ratio of the indices of contact length at the axisymmetrical positions.

According to a thirteenth aspect of the present invention, there is provided a method of estimating the dynamic state amount of a tire, wherein the average value of the indices of contact length or the indices of deformation length outside the contact surface at axisymmetrical positions is calculated, a load is estimated from the average value of the indices of contact length or the indices of deformation length outside the contact surface, and lateral force estimated from the ratio of the indices of contact length is compensated by this estimated load.

According to a fourteenth aspect of the present invention, there is provided a method of estimating the dynamic state amount of a tire, wherein the time between deformation points outside the contact patch of the tire is detected from the temporal waveform of the amount of deformation at axisymmetrical positions, or the temporal waveform of a differential value obtained by time differentiating the amount of deformation or the temporal waveform of an integrated value obtained by time integrating the amount of deformation, the indices of deformation length outside the contact patch are calculated by multiplying the detected time between deformation points outside the contact patch by the wheel speed to obtain the ratio of the indices of deformation length outside the contact patch, the posture angle of the tire is estimated from the ratio of the indices of deformation length outside the contact patch and the ratio of the indices of contact length, a load is estimated from the average value of the indices of contact length or the indices of deformation length outside the contact patch and lateral force estimated from the ratio of indices of contact length is corrected by the estimated posture angle and the estimated load.

According to a fifteenth aspect of the present invention, there is provided a method of estimating the dynamic state amount of a tire, wherein the contact time of the tire is detected from the temporal waveform of the amount of deformation at axisymmetrical positions which are equally distant in the axial direction from the center in the axial direction of the tire on almost the same cross-section in the radial direction of the tire, or the temporal waveform of a differential value obtained by time differentiating the amount of deformation, or the temporal waveform of an integrated value obtained by time integrating the amount of deformation, the indices of contact length of the tire are calculated by multiplying the detected contact time by the wheel speed, and lateral force generated in the tire is estimated from the difference between the indices of contact length at the axisymmetrical positions.

According to a sixteenth aspect of the present invention, there is provided a method of estimating the dynamic state amount of a tire, wherein the time between deformation points outside the contact patch of the tire is detected from the temporal waveform of the amount of deformation at axisymmetrical positions, or the temporal waveform of a differential value obtained by time differentiating the amount of deformation, or the temporal waveform of an integrated value obtained by time integrating the amount of deformation, the indices of deformation length outside the contact patch are calculated by multiplying the detected time between the deformation points outside the contact patch by the wheel speed to obtain the ratio of the indices of deformation length outside the contact patch, the posture angle of the tire is estimated from the ratio of the indices of deformation length outside the contact patch and the ratio of the indices of contact length, and lateral force estimated from the difference between the indices of contact length is compensated by the estimated posture angle.

According to a seventeenth aspect of the present invention, there is provided a method of estimating the dynamic state amount of a tire, wherein the estimated value of load is compensated by the estimated value of lateral force estimated from the difference between the indices of contact length.

According to an eighteenth aspect of the present invention, there is provided a method of estimating the dynamic state amount of a tire, wherein the dynamic state amount for estimating the above dynamic state is longitudinal force generated in the tire.

According to a nineteenth aspect of the present invention, there is provided a method of estimating the dynamic state amount of a tire, wherein the amounts of deformation at deformation points outside the contact patch of the tire, which are located before and after the contact patch, are detected from the temporal waveform of the amount of deformation, or the temporal waveform of a differential value obtained by time differentiating the amount of deformation or the temporal waveform of an integrated value obtained by time integrating the amount of deformation to obtain the ratio of the amounts of deformation outside the contact patch, and longitudinal force generated in the tire is estimated from the ratio of the amounts of deformation outside the contact patch.

According to a twentieth aspect of the present invention, there is provided a method of estimating the dynamic state amount of a tire, wherein the ratios of the amounts of deformation outside the contact patch of at least two positions are calculated, and longitudinal force generated in the tire is estimated from the average value of the ratios.

According to a twenty-first aspect of the present invention, there is provided a method of estimating the dynamic state amount of a tire, wherein the length of deformation on the leading edge side is calculated by multiplying the time between the deformation point outside the contact patch on the leading edge side and the leading edge of contact patch by the wheel speed, the length of deformation on the trailing edge side is calculated by multiplying the time between the deformation point outside the contact patch on the trailing edge side and the trailing edge of contact patch by the wheel speed, and longitudinal force applied to the tire is estimated from the ratio of them or the difference between them.

According to a twenty-second aspect of the present invention, there is provided a method of estimating the dynamic state amount of a tire, wherein the ratio or difference between the length of deformation on the leading edge side and the length of deformation on the trailing edge side of at least two positions is calculated, and longitudinal force generated in the tire is estimated from the average value of them.

According to a twenty-third aspect of the present invention, there is provided a method of estimating the dynamic state amount of a tire, wherein the points for measuring the amount of deformation include at least axisymmetrical positions which are equally distant in the axial direction from the center in the axial direction of the tire on almost the same cross-section in the radial direction of the tire.

According to a twenty-fourth aspect of the present invention, there is provided a method of estimating the dynamic state amount of a tire, wherein either one or both of the inside pressure and inside temperature of the wheel portion or the tire are detected, and the wheel speed and the estimated value of any load, lateral force or longitudinal force are compensated by the inside pressure or temperature, or both the inside pressure and temperature.

According to a twenty-fifth aspect of the present invention, there is provided A tire with sensors for estimating the dynamic state amount of the tire while running, wherein a plurality of sensors for measuring the amount of deformation of the tire are installed at the inner side of the belt portion of a tire tread in the radial direction.

According to a twenty-sixth aspect of the present invention, there is provided a tire with sensors, wherein the sensors are installed at the inner surface of an inner liner portion, or between the inner liner and a ply, or between plies or between the ply and the belt.

According to a twenty-seventh aspect of the present invention, there is provided a tire with sensors, wherein at least two of the sensors are installed at axisymmetrical positions which are equally distant in the axial direction from the center in the axial direction of the tire on almost the same cross-section in the radial direction of the tire.

According to a twenty-eighth aspect of the present invention, there is provided a tire with sensors, wherein the sensors are for measuring strain in the circumferential direction or strain in the lateral direction of the tire.

According to a twenty-ninth aspect of the present invention, there is provided a tire with sensors, wherein the sensors are for measuring a change in strain in the circumferential direction or a change in strain in the lateral direction of the tire.

According to a thirtieth aspect of the present invention, there is provided The tire with sensors, wherein the sensors are for measuring bending strain in the circumferential direction or bending strain in the lateral direction of the tire.

According to a thirty-first aspect of the present invention, there is provided a tire with sensors, wherein the above sensors are for measuring shear strain in the circumferential direction or shear strain in the lateral direction of the tire.

According to a thirty-second aspect of the present invention, there is provided a tire with sensors, wherein the distance between two sensors for measuring strain, a change in strain, bending strain or shear strain in the circumferential direction or the lateral direction is ½ or less of the maximum width of the tire. According to a thirty-third aspect of the present invention, there is provided a tire with sensors, wherein the sensor length in the detection direction is 20 mm or less.

According to a thirty-fourth aspect of the present invention, there is provided a tire with sensors, wherein the sensors are bonded to the rubber portion of the tire by curing. This ensures the measurement of the deformation of the tire and the long-term detection of the deformation.

According to a thirty-fifth aspect of the present invention, there is provided a tire with sensors, wherein the above sensors are bonded to an inner liner rubber by an adhesive and covered with a rubber or a resin.

According to a thirty-sixth aspect of the present invention, there is provided a tire with sensors, wherein the above sensors are for measuring the amount of deformation from a change in electric resistance value.

According to a thirty-seventh aspect of the present invention, there is provided a tire with sensors, wherein the above sensors are strain gauges.

According to a thirty-eighth aspect of the present invention, there is provided a tire with sensors, wherein the sensors are conductive rubbers.

According to a thirty-ninth aspect of the present invention, there is provided a tire with sensors, wherein the volume resistivity of the conductive rubber under no load is $10^7$ to $10^9$ $\Omega$m.

According to a fortieth aspect of the present invention, there is provided a tire with sensors, wherein a conductive rubber having a tan $\delta$ smaller than 0.1 is used as the above conductive rubber. The above value of tan $\delta$ is obtained when a repeated strain (50 Hz) of 0 to 1% is given to the above conductive rubber.

According to a forty-first aspect of the present invention, there is provided a tire with sensors, wherein the upper limit of the thickness of the above conductive rubber is 2 mm.

According to a forty-second aspect of the present invention, there is provided a tire with sensors, wherein the conductive rubber is covered with a rubber having a resistance value 100 times or more larger than that of the conductive rubber.

According to a forty-third aspect of the present invention, there is provided a tire with sensors, wherein the above sensors are for measuring the above amount of deformation from a change in generated charge or generated voltage.

According to a forty-fourth aspect of the present invention, there is provided a tire with sensors, wherein the above sensors are piezoelectric polymer films.

According to a forty-fifth aspect of the present invention, there is provided a tire with sensors, wherein the above piezoelectric polymer films are PVDF films.

According to a forty-sixth aspect of the present invention, there is provided a tire with sensors, wherein the piezoelectric voltage coefficient of the above piezoelectric polymer films is 0.05 Vm/N or more.

According to a forty-seventh aspect of the present invention, there is provided a tire with sensors, wherein the reduction rate of the piezoelectric voltage coefficient value at 120° C. from the piezoelectric voltage coefficient value at 25° C. of the above piezoelectric polymer film is 30% or less.

According to a forty-eighth aspect of the present invention, there is provided an estimation apparatus of a tire dynamic state amount comprising;

tire deformation amount detection means for measuring the amount of deformation of the tire, installed at two or more positions on almost the same cross-section in the radial direction of the tire at the inner surface of the inner liner portion of a tire tread or between the belt portion and the inner liner portion of the tire;

a wheel speed sensor for detecting the wheel speed of the tire;

contact time detection means for detecting the contact time of the tire based on the temporal waveform of the amount of deformation of the tire detected by the tire deformation amount measuring means, or the temporal waveform of a differential value obtained by time differentiating the amount of deformation, or the temporal waveform of an integrated value obtained by time integrating the amount of deformation;

contact length index calculating means for calculating the indices of contact length from the contact time and the wheel speed detected by the wheel speed sensor;

means of calculating the average value of the indices of contact length;

memory means for storing a map showing the relationship between the average value of the indices of contact length and load; and load estimation means for estimating a load applied to the tire by using the calculated average value of the indices of contact length and the map.

According to a forty-ninth aspect of the present invention, there is provided an estimation apparatus of a tire dynamic state amount comprising;

tire deformation amount detection means for measuring the amount of deformation of the tire, installed at two or more positions on almost the same cross-section in the radial direction of the tire at the inner surface of the inner liner portion of a tire tread or between the belt portion and the inner liner portion of the tire;

a wheel speed sensor for detecting the wheel speed of the tire;

means of detecting the time between deformation points outside the contact patch of the tire based on the temporal waveform of the amount of deformation of the tire detected by the tire deformation amount measuring means, the temporal waveform of a differential value obtained by time differentiating the amount of deformation, or the temporal waveform of an integrated value obtained by time integrating the amount of deformation;

means of calculating the indices of deformation length outside the contact patch from the time between deformation points outside the contact patch and the wheel speed detected by the wheel speed sensor;

means of calculating the average value of the indices of deformation length outside the contact patch;

memory means for storing a map showing the relationship between the average value of the indices of deformation length outside the contact patch and load; and load estimation means for estimating a load applied to the tire by using the calculated average value of the indices of deformation length outside the contact patch and the map.

According to a fiftieth aspect of the present invention, there is provided an estimation apparatus of a tire dynamic state amount comprising;

tire deformation amount detection means for measuring the amount of deformation of the tire, installed at two or more positions on almost the same cross-section in the radial direction of the tire at the inner surface of the inner liner portion of a tire tread or between the belt portion and the inner liner portion of the tire;

a wheel speed sensor for detecting the wheel speed of the tire;

contact time detection means for detecting the contact time of the tire based on the temporal waveform of the amount of deformation of the tire detected by the tire deformation amount measuring means, the temporal waveform of a differential value obtained by time differentiating the amount of deformation, or the temporal waveform of an integrated value obtained by time integrating the amount of deformation;

contact length index calculating means for calculating the indices of contact length from the contact time and the wheel speed detected by the wheel speed sensor;

means of calculating the ratio of the indices of contact length;

memory means for storing a map showing the relationship between the ratio of the indices of contact length and lateral force; and lateral force estimation means for estimating lateral force generated in the tire by using the ratio of the indices of contact length and the map.

According to a fifty-first aspect of the present invention, there is provided an estimation apparatus of a tire dynamic state amount comprising;

tire deformation amount detection means for measuring the amount of deformation of the tire, installed at two or more positions on almost the same cross-section in the radial direction of the tire at the inner surface of the inner liner portion of a tire tread or between the belt portion and the inner liner portion of the tire;

a wheel speed sensor for detecting the wheel speed of the tire;

means of detecting the time between deformation points outside the contact patch of the tire based on the temporal waveform of the amount of deformation of the tire detected by the tire deformation amount measuring means, the temporal waveform of a differential value obtained by time differentiating the amount of deformation, or the temporal waveform of an integrated value obtained by time integrating the amount of deformation to calculate the indices of deformation length outside the contact patch by multiplying the detected time between deformation points outside the contact patch by the wheel speed;

means of calculating the ratio of the indices of deformation length outside the contact patch;

memory means for storing a map showing the relationship between the ratio of the indices of deformation length outside the contact patch and the ratio of the indices of contact length and the camber angle and a correction map for compensating lateral force according to the camber angle; and lateral force estimation means for estimating lateral force generated in the tire by using the ratio of the indices of deformation length outside the contact patch, the ratio of the indices of contact length and the maps.

According to a fifty-second aspect of the present invention, there is provided an estimation apparatus of a tire dynamic state amount comprising;

tire deformation amount detection means for measuring the amount of deformation of the tire, installed at two or more positions on almost the same cross-section in the radial direction of the tire at the inner surface of the inner liner portion of a tire tread or between the belt portion and the inner liner portion of the tire;

a wheel speed sensor for detecting the wheel speed of the tire;

contact time detection means for detecting the contact time of the tire based on the temporal waveform of the amount of deformation of the tire detected by the tire deformation amount measuring means, the temporal waveform of a differential value obtained by time differentiating the amount of deformation, or the temporal waveform of an integrated value obtained by time integrating the amount of deformation;

contact length index calculating means for calculating the indices of contact length from the contact time and the wheel speed detected by the wheel speed sensor;

means of calculating the difference between the indices of contact length;

memory means for storing a map showing the relationship between the difference between the indices of contact length and lateral force; and lateral force estimation means for estimating lateral force generated in the tire by using the difference between the indices of contact length and the map.

According to a fifty-third aspect of the present invention, there is provided an estimation apparatus of a tire dynamic state amount comprising;

tire deformation amount detection means for measuring the amount of deformation of the tire, installed at two or more positions on almost the same cross-section in the radial direction of the tire at the inner surface of the inner liner portion of a tire tread or between the belt portion and the inner liner portion of the tire;

a wheel speed sensor for detecting the wheel speed of the tire;

contact time detection means for detecting the contact time of the tire based on the temporal waveform of the amount of deformation of the tire detected by the tire deformation amount measuring means, the temporal waveform of a differential value obtained by time differentiating the amount of deformation, or the temporal waveform of an integrated value obtained by time integrating the amount of deformation;

contact length index calculating means for calculating the indices of contact length from the contact time and the wheel speed detected by the wheel speed sensor;

means of calculating the average value of the indices of contact length;

memory means for storing a map showing the relationship between the average value of the indices of contact length and load;

load estimation means for estimating a load applied to the tire by using the average value of the indices of contact length and the map; and compensation means for compensating the estimated value of the load by lateral force estimated by the tire dynamic state amount estimation apparatus.

According to a fifty-fourth aspect of the present invention, there is provided an estimation apparatus of a tire dynamic state amount comprising;

tire deformation amount detection means for measuring the amount of deformation of the tire, installed at two or more positions on almost the same cross-section in the radial direction of the tire at the inner surface of the inner liner portion of a tire tread or between the belt portion and the inner liner portion of the tire;

a wheel speed sensor for detecting the wheel speed of the tire;

means of detecting the amount of deformation at deformation points outside the contact patch of the tire based on the temporal waveform of the amount of deformation of the tire detected by the tire deformation amount measuring means, the temporal waveform of a differential value obtained by time differentiating the amount of deformation, or the temporal waveform of an integrated value obtained by time integrating the amount of deformation;

means of calculating the ratio of the amounts of deformation at deformation points outside the contact patch, which are located before and after the contact patch;

memory means for storing a map showing the relationship between the ratio of the amounts of deformation at deformation points outside the contact patch and longitudinal force; and longitudinal force estimation means for estimating longitudinal forced applied to the tire by using the amount of deformation at deformation points outside the contact patch and the map.

According to a fifty-fifth aspect of the present invention, there is provided an estimation apparatus of a tire dynamic state amount comprising;

tire deformation amount detection means for measuring the amount of deformation of the tire, installed at two or more positions on almost the same cross-section in the radial direction of the tire at the inner surface of the inner liner portion of a tire tread or between the belt portion and the inner liner portion of the tire;

a wheel speed sensor for detecting the wheel speed of the tire;

means of detecting the time between a deformation point outside the contact patch on the leading edge side of the tire and the contact end on the leading edge side based on the temporal waveform of the amount of deformation of the tire detected by the tire deformation amount measuring means, the temporal waveform of a differential value obtained by time differentiating the amount of deformation, or the temporal waveform of an integrated value obtained by time integrating the amount of deformation;

means of detecting the time between a deformation point outside the contact patch on the trailing edge side of the tire and the contact end on the trailing edge side;

means of calculating the length of deformation on the leading edge side and the length of deformation on the trailing edge side by multiplying the time between the deformation point outside the contact patch on the leading edge side of the tire and the contact end on the leading edge side and the time between the deformation point outside the contact patch on the trailing edge side of the tire and the contact end on the trailing edge side by the wheel speed detected by the wheel speed sensor, respectively, to compute the ratio of the length of deformation on the leading edge side to the length of deformation on the trailing edge side;

memory means for storing a map showing the relationship between the ratio of the length of deformation on the leading edge side to the length of deformation on the trailing edge side and longitudinal force; and longitudinal force estimation means for estimating longitudinal force applied to the tire by using the ratio of the length of deformation on the leading edge side to the length of deformation on the trailing edge side and the map.

According to a fifty-sixth aspect of the present invention, there is provided an estimation apparatus of a tire dynamic state amount, further comprising either one or both of a pressure sensor for measuring the inside pressure of the tire and a temperature sensor for measuring the inside temperature of the tire, and communication means for transmitting the amount of deformation of the tire measured by the tire deformation amount measuring means and either one or both of the measured values of the inside pressure and inside temperature of the tire to the car body side.

According to a fifty-seventh aspect of the present invention, there is provided an estimation apparatus of a tire dynamic state amount, wherein the communication means comprises means of generating a power voltage by it receiving a radio wave transmitted from the car body side.

According to a fifty-eighth aspect of the present invention, there is provided a tire dynamic state amount estimation apparatus, further comprising a power generator for generating power by the rotating of the tire.

Effect of the Invention

According to the present invention, a sensor for measuring the deformation amount of the tire such as a strain gauge, conductive rubber or piezoelectric polymer film is installed at two or more positions on almost the same cross-section in the radial direction of the tire on the inner side in the radial direction of the belt portion of the tire tread to measure the amount of deformation of the tire such as tensile or compression strain in the circumferential direction or lateral direction of the tire, a change in tensile or compression strain, bending strain outside the tread surface or shear strain, the contact length or deformation length of the tire is calculated from the measured amount of deformation and the wheel speed, and the dynamic state amount of the tire such as a load applied to the tire, or lateral force or longitudinal force generated in the tire for estimating the dynamic state of the tire can be estimated accurately and stably based on the calculated contact length or deformation length.

DETAILED DESCRIPTION OF THE PREFERRED EMBODIMENTS

Preferred embodiments of the present invention will be described herein under with reference to the accompanying drawings.

Embodiment 1

Figure 1:
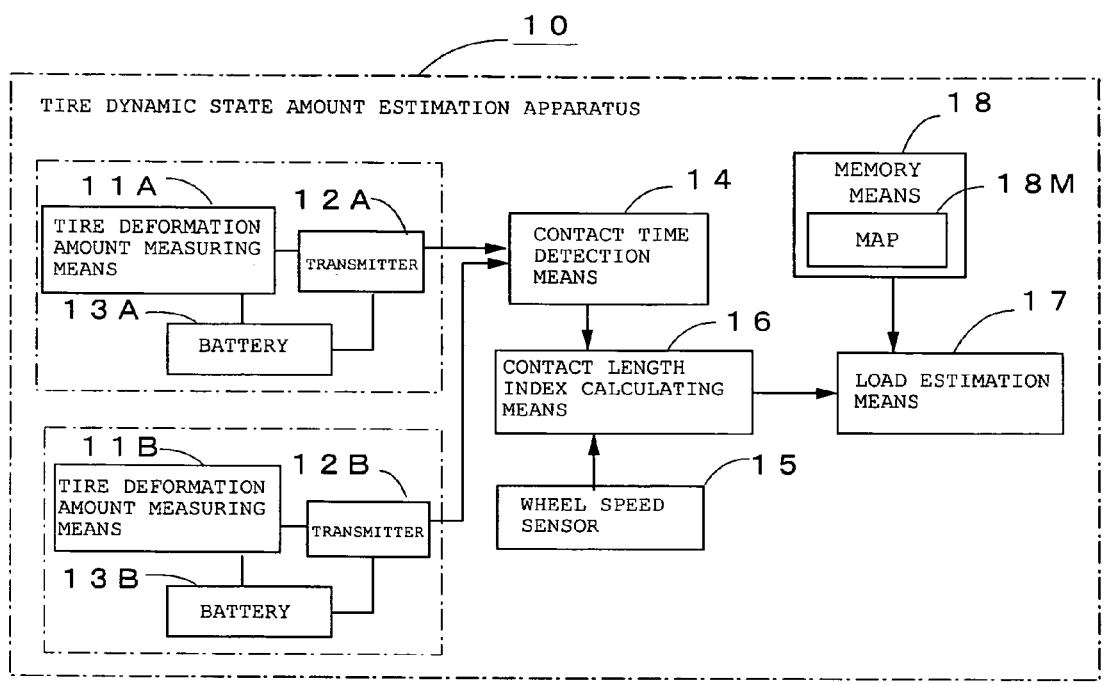
FIG. 1 is a functional block diagram showing the constitution of a tire dynamic state amount estimation apparatus according to Embodiment 1 of the present invention.
Figure 2:
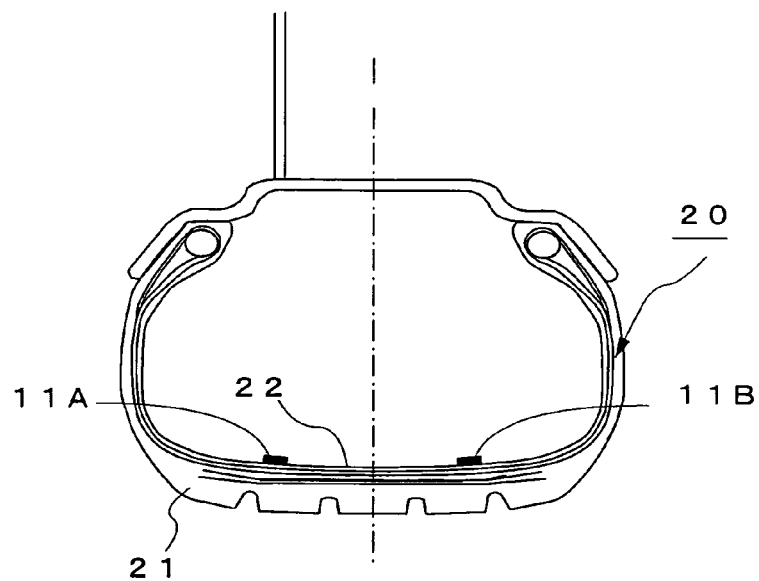
FIG. 2 is a diagram of a tire with sensors according to the present invention.

FIG. 1 is a functional block diagram showing the constitution of a tire dynamic state amount estimation apparatus 10 according to Embodiment 1 of the present invention, and FIG. 2 is a diagram of a tire 20 with sensors according to the present invention. In these figures, 11A and 11B denote tire deformation amount measuring means for measuring the deformation amount of an inner liner portion 22 which is deformed by an input into a tire tread 21 from the road surface, 12A and 12B transmitters for transmitting the measurement data of the above tire deformation amount measuring means 11A and 11B, 13A and 13B batteries for supplying power to the above tire deformation amount measuring means 11A and 11B and the above transmitters 12A and 12B, 14 contact time detection means for detecting the contact time during which the tire 20 with sensors is in contact with the road surface based on temporal in the deformation amount of the inner liner portion 22 which are the outputs of the above tire deformation amount measuring means 11A and 11B, 15 a wheel speed sensor for detecting the speed of a wheel while running, 16 contact length index calculating means for calculating contact length indices $k_A$ and $k_B$ which have the relationship of 1:1 with the contact length from the wheel speed detected by the wheel speed sensor 15 and the above detected contact time, and 17 load estimation means for calculating the average value k of contact length indices by averaging the above two contact length indices $k_A$ and $k_B$ and estimating a load applied to the tire 20 with sensors by using the average value k of the contact length indices and a map 18M showing the relationship between the average value of contact length indices and load pre-stored in memory means 18.

The above two tire deformation amount measuring means 11A and 11B may share one battery and one transmitter. Arithmetic operation units such as the contact time detection means 14 and the contact length index calculating means 16 may be provided on the tire side to transmit only operation results.

When a power regeneration circuit for generating a power voltage by receiving a radio wave transmitted from the body side is provided on the tire side or a power generator for generating power by the rolling of the tire is provided, the above batteries 13A and 13B can be omitted.

In this embodiment, strain gauges are used as the above two tire deformation amount measuring means 11A and 11B, these tire deformation amount measuring means 11A and 11B are fixed by an adhesive at axisymmetrical positions (for example, 2nd block portions) equally distant in the axial direction from the center in the axial direction of the tire on almost the same cross-section in the radial direction of the tire of the inner liner portion 22 of the tire 20 with sensors in the direction of detecting tensile strain (or compression strain) in the circumferential direction of the tire 20 with sensors and coated with a resin. The above tire deformation amount measuring means 11A and 11B may be attached to the inner liner portion 22 by curing bonding and covered with rubber.

Figure 3:
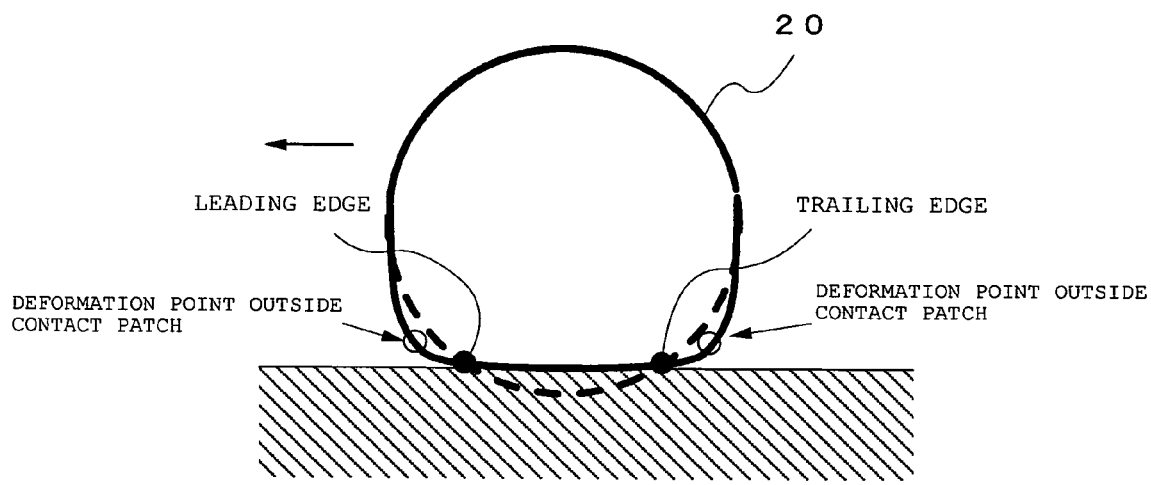
FIG. 3 is a diagram showing the deformation state of the tire.

When a load is applied to the tire 20 with sensors, as shown in FIG. 3, the tire 20 with sensors is pressed against the road surface and deformed. Stated more specifically, compression stress (strain) is applied to the inner liner portion 22 which is the inner wall of the tire tread 21 before treading and after kicking and tensile stress (strain) is applied to the contact portion. Therefore, the above tire deformation amount measuring means 11A and 11B output the deformation waveform of the inner surface of the tread as shown by the solid line in FIG. 4. The contact time of the tire 20 with sensors can be detected by calculating a time difference between positions (contact ends) having the highest strain deformation speed of the deformation waveform.

Figure 4:
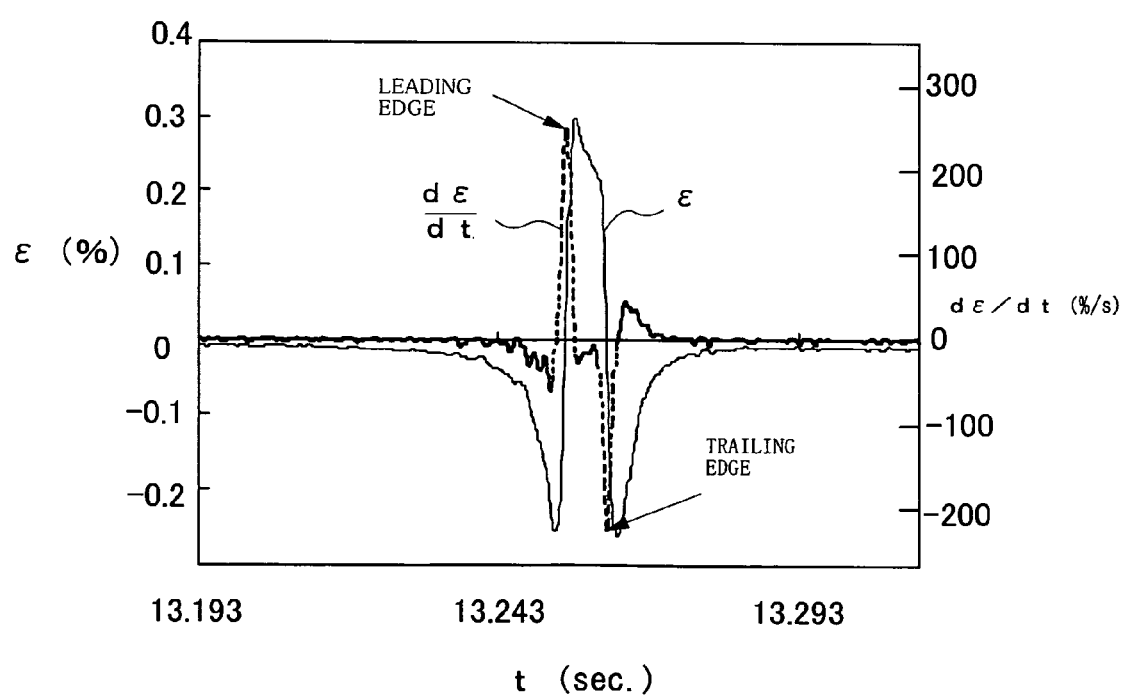
FIG. 4 is a graph showing the deformation waveform of the inner surface of a tread and its differential waveform.

Since the positions of the above contact ends are hardly known from the deformation waveform of the inner surface of the tread, the temporal waveform of a differential value calculated by time differentiating the above deformation waveform as shown by the broken line in FIG. 4 is obtained, and the position of the contact end on the tread side and the position of the contact end on the kick side which are peak values of the temporal waveform of the above differential value are obtained to detect the time between the above contact ends, thereby detecting the contact time of the tire 20 with sensors. Thereby, the contact time of the tire 20 with sensors can be detected accurately.

An integrated value calculated by time integrating the deformation waveform may be used according to the means of measuring the above deformation amount. As a simple method, points taking the same value as that of the base line of the deformation waveform of the inner surface of the tread may be taken as contact ends.

Figure 5:
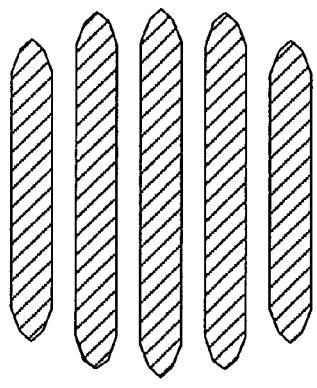
FIGS. 5(a) and 5(b) are diagrams showing the contact shape of the tire tread surface.
Figure 5:
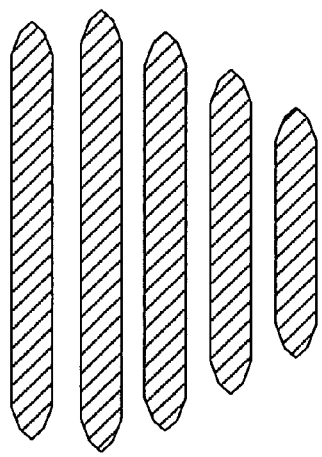

When lateral force is generated in the tire 20 with sensors, as shown in FIGS. 5(a) and 5(b), the contact shape of the tire becomes such that the contact length on one side of the center in the axial direction of the tire becomes large and the contact length on the other side becomes small. Therefore, when a load is to be estimated from the contact length at one position only, it is affected by lateral force. That is, even when the same load is applied, if lateral force is input, the contact length on one side becomes large and the contact length on the other side becomes small. To cope with this, in this embodiment, the load estimation means 17 calculates the average value k of contact length indices obtained from the above tire deformation amount measuring means 11A and 11B to obtain a load applied to the tire by using the calculated average value k of contact length indices and the map 18M showing the relationship between the average value of contact length indices and load pre-stored in the memory means 18.

Figure 6:
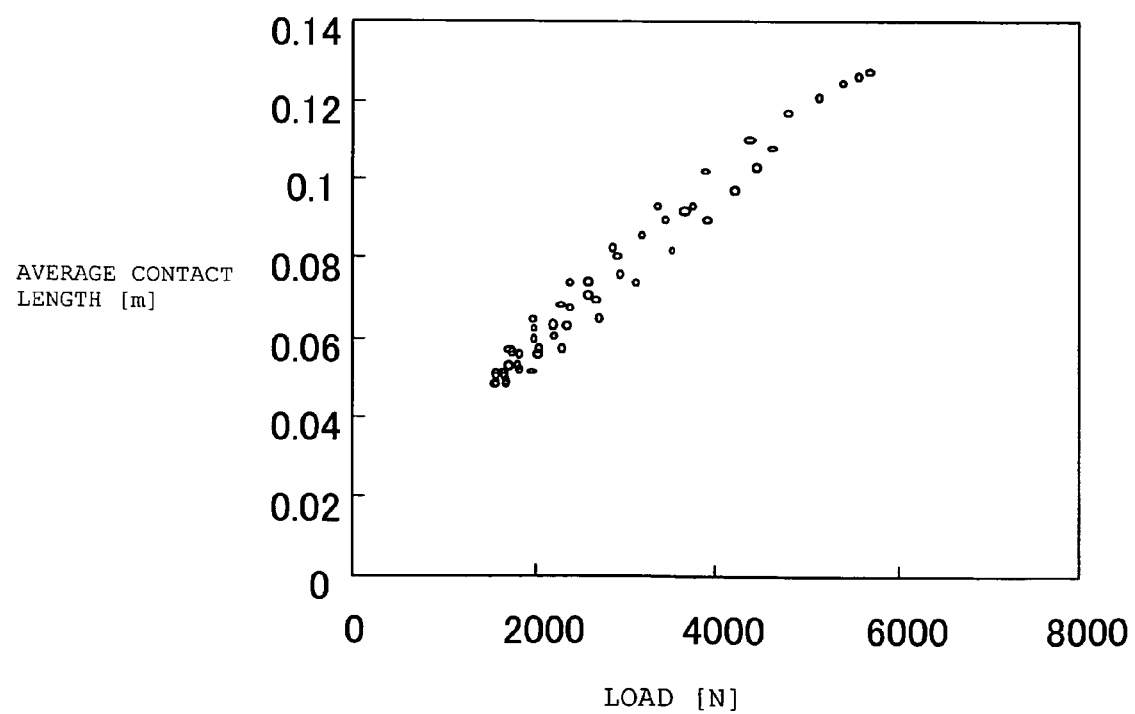
FIG. 6 is a graph showing the relationship between load and average contact length.

FIG. 6 is a graph showing the relationship between load and average contact length when a vehicle equipped with the tire 20 with sensors comprising the tire deformation amount measuring means 11A and 11B installed on the inner liner portion 22 is caused to run at a speed of 60 km/hr and the load and the slip angle are changed continuously by using a flat belt tester. The road surface is a safety walk surface, the size of the tire is 225/55R18, and the inside pressure is 230 MPa. This average contact length is obtained by time differentiating the strain waveforms which are the outputs of the tire deformation amount measuring means 11A and 11B and multiplying the time between their peaks by the wheel speed. As understood from this graph, the average contact length and the load show a good relationship even during the generation of lateral force. Therefore, when a load applied to the tire is obtained by using the map 18M showing the relationship between the average value of contact length indices and load prepared based on the data, even if lateral force is generated, a load applied to the tire can be obtained accurately.

According to this Embodiment 1, the tire deformation amount measuring means 11A and 11B are installed at axisymmetrical positions which are equally distant in the axial direction from the center in the axial direction of the tire on the cross-section in the axial direction of the tire of the inner liner portion 22 of the tire tread 21 to measure the deformation waveform of the above inner liner portion 22 so as to detect the contact time which is a time difference between contact ends from the deformation waveforms, the contact length indices $k_A$ and $k_B$ are calculated from this contact time and the wheel speed detected by the wheel speed sensor 15 to calculate the average value k of the above indices $k_A$ and $k_B$, and a load applied to the tire is obtained by using this calculated average value k of contact length indices and the map 18M showing the relationship between the average value of contact length indices and load pre-stored in the memory means 18. Therefore, even when lateral force is generated, the contact length can be estimated accurately and a load applied to the tire can be obtained accurately.

Since the strain of the inner liner portion 22 is directly measured in this embodiment, signal output gains are almost the same at the time of running at a low speed. Therefore, the contact length can be estimated accurately and the detection stability of the contact length can be greatly improved because peaks generated from portions other than the contact ends in the strain differential waveform when running on a rough road or a wet road having a certain depth of water are not large.

Although a load applied to the tire is estimated from the contact length indices in the above Embodiment 1, a load applied to the tire may be estimated by detecting the time between deformation points outside the contact patch of the tire from the temporal waveform of the deformation amount of the above inner liner portion 22, the temporal waveform of a differential value obtained by time differentiating the above deformation amount or the temporal waveform of an integrated value obtained by time integrating the above deformation amount, and calculating the index of deformation length outside the contact patch by multiplying the detected time between the deformation points outside the contact patch by the wheel speed. When deformation points before and after the contact patch shown by white circles in FIG. 3 and having high interrelation with the load are used as the deformation points outside the contact patch, and the average value of the indices of deformation length outside the contact patch is obtained to estimate a load applied to the tire, the load applied to the tire can be estimated accurately.

In the above embodiment, the tire deformation amount measuring means 11A and 11B are installed on the inner surface of the inner liner portion 22. The present invention is not limited to this and they may be installed on a portion which is deformed by an input into the tire tread 21 from the road surface of a tire rubber portion between the inner liner and the ply, between plies, or between the ply and the belt. When durability is taken into consideration, the tire deformation amount measuring means 11A and 11B are preferably installed on the inner side in the radial direction of the belt portion of the tire tread rather than a portion between the cap tread and the belt as described above.

In the above embodiment, strain in the circumferential direction of the inner liner portion 22 or a change in strain in the circumferential direction is detected. The contact time may be obtained by detecting bending strain or shear strain outside the tread surface. That is, as the belt rarely elongates by an input from the road surface, when the belt is bent, the inner surface and the outer surface of the belt expand and contract with the belt as the neutral axis. Since bending strain and shear strain form waveforms having almost the same phase as the above tension and compression strain, commercially available strain gauges or two-way strain gauges are fixed to the inner liner portion 22 to detect the above bending strain or shear strain, thereby making it possible to detect the deformation of the tire, that is, the contact points and the deformation points outside the tread surface.

Figure 7:
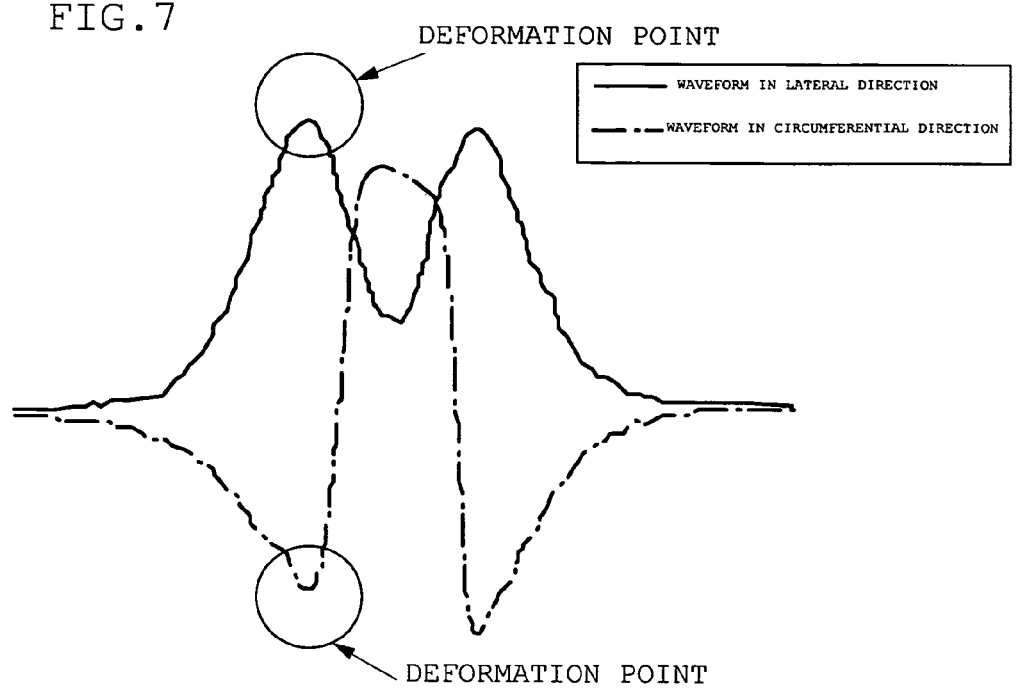
FIG. 7 is a graph showing comparison between the waveform of strain in the circumferential direction of the tire and the waveform of strain in the lateral direction of the tire.

Since strain in the lateral direction of the tire of the rubber portion on the inner side of the inner liner portion 22, between the inner liner and the ply, between the plies or between the ply and the belt changes according to strain in the circumferential direction of the tire, the deformation points of a strain waveform in the lateral direction of the tire shown by the solid line in FIG. 7 and the deformation points of the strain waveform in the circumferential direction of the tire shown by the one-dot chain line of FIG. 7 are almost at the same positions. Therefore, the detection directions of the tire deformation amount measuring means 11A and 11B are made the lateral direction of the tire, and the contact time may be obtained by detecting strain in the lateral direction of the inner side in the radial direction of the belt portion of the tire tread, a change in strain in the lateral direction or bending strain or shear strain outside the tread surface.

At this point, the distance between the above tire deformation amount measuring means 11A and 11B is preferably ½ or less of the maximum width of the tire. That is, when the above distance becomes larger than ½ of the maximum width of the tire, if lateral force is applied, either one of the above tire deformation amount measuring means 11A and 11B is positioned outside the contact patch and the amount of deformation may not be detected. Therefore, the above distance is preferably set to ½ or less, particularly about ⅓ of the maximum width of the tire.

Embodiment 2

In the above Embodiment 1, strain in the circumferential direction at the positions which are axisymmetrical in the axial direction about the center in the axial direction of the tire of the inner liner portion 22, a change in strain in the circumferential direction, or bending strain outside the tread surface is measured to obtain the average value k of contact length indices $k_A$ and $k_B$ at the above two positions, and a load applied to the tire 20 with sensors is estimated from the average value k of contact length indices. Lateral force generated in the above tire can be estimated from the ratio R of the above contact length indices $k_A$ and $k_B$ at the above two positions.

Figure 8:
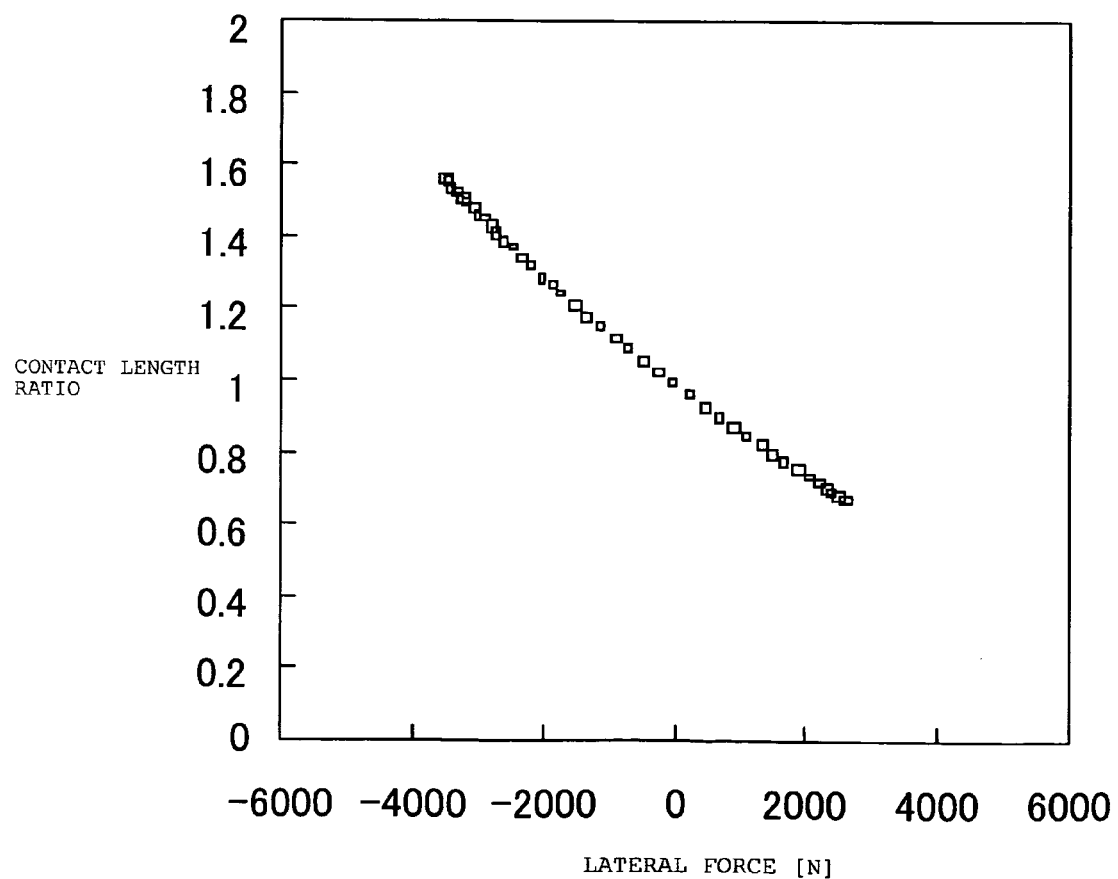
FIG. 8 is a graph showing the relationship between lateral force and contact length ratio.

That is, when lateral force is generated in the tire 20 with sensors, as shown in FIGS. 5(a) and 5(b), its contact shape becomes such that the contact length on one side of the center in the axial direction of the tire becomes large and the contact length on the other side becomes small. Then, when the contact lengths of two points on both sides of the center in the axial direction of the tire of the tire tread surface are detected and the relationship between the ratio of these (contact length ratio) and the size of lateral force is investigated, as shown in FIG. 8, the contact length ratio and the size of lateral force show a good relationship. Therefore, when the tire deformation amount measuring means 11A and 11B are installed at axisymmetrical positions which are equally distant in the axial direction from the center in the axial direction of the tire of the inner liner portion of the tire 20 with sensors, and the relationship between the above contact length ratio R and the size of lateral force is measured to prepare a map 32M showing the relationship between the contact length ratio R and the size of lateral force, lateral force generated in the tire can be estimated.

Figure 9:
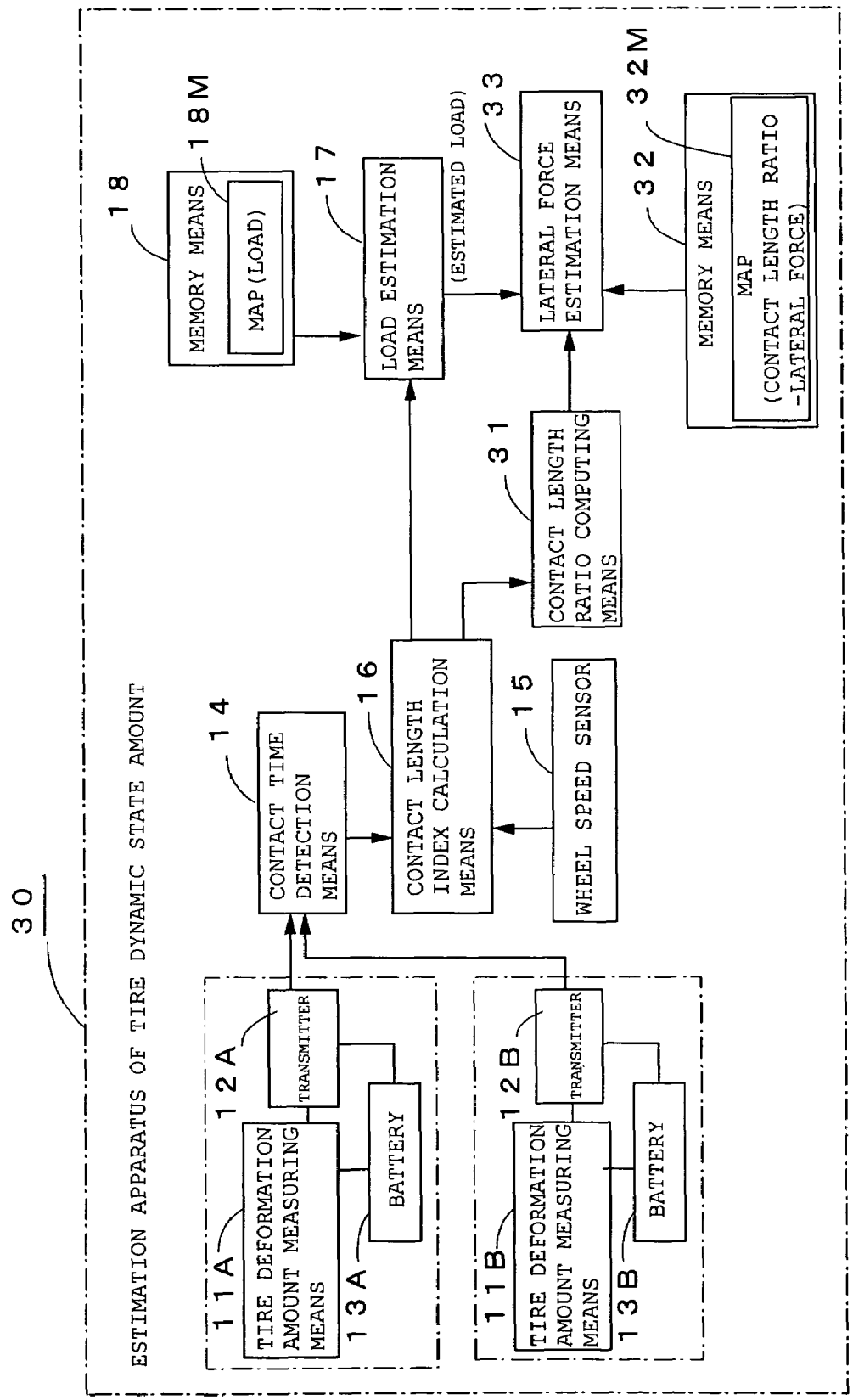
FIG. 9 is a functional block diagram showing the constitution of a tire dynamic state amount estimation apparatus according to Embodiment 2 of the present invention.

FIG. 9 is a diagram showing the constitution of a tire dynamic state amount estimation apparatus 30 according to Embodiment 2. This tire dynamic state amount estimation apparatus 30 is constructed by adding contact length ratio computing means 31 for computing the ratio $R=k_A/k_B$ and lateral force estimation means 33 for estimating lateral force generated in the tire 20 with sensors by using the map 32M showing the relationship between the contact length ratio R and the size of lateral force pre-stored in the memory means 32 to the above tire dynamic state amount estimation apparatus 10. A load applied to the tire and lateral force generated in the tire can be both estimated with this dynamic state amount estimation apparatus 30.

Since the relationship between the contact length ratio R and lateral force changes according to load, when lateral force estimated by the above lateral force estimation means 33 is corrected based on the estimated value of load estimated by the above load estimation means 17 as shown in FIG. 9, the estimation accuracy of lateral force can be further improved.

Figure 10:
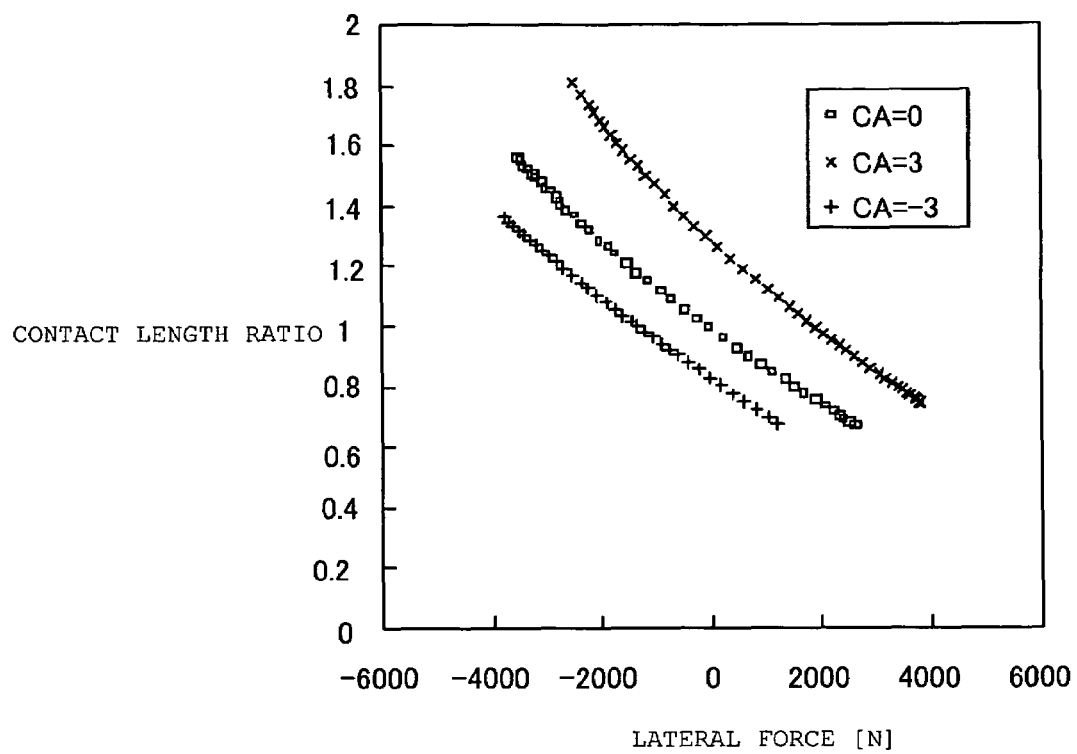
FIG. 10 is a graph showing the relationship between lateral force and the ratio of contact lengths when the camber angle is changed.
Figure 11:
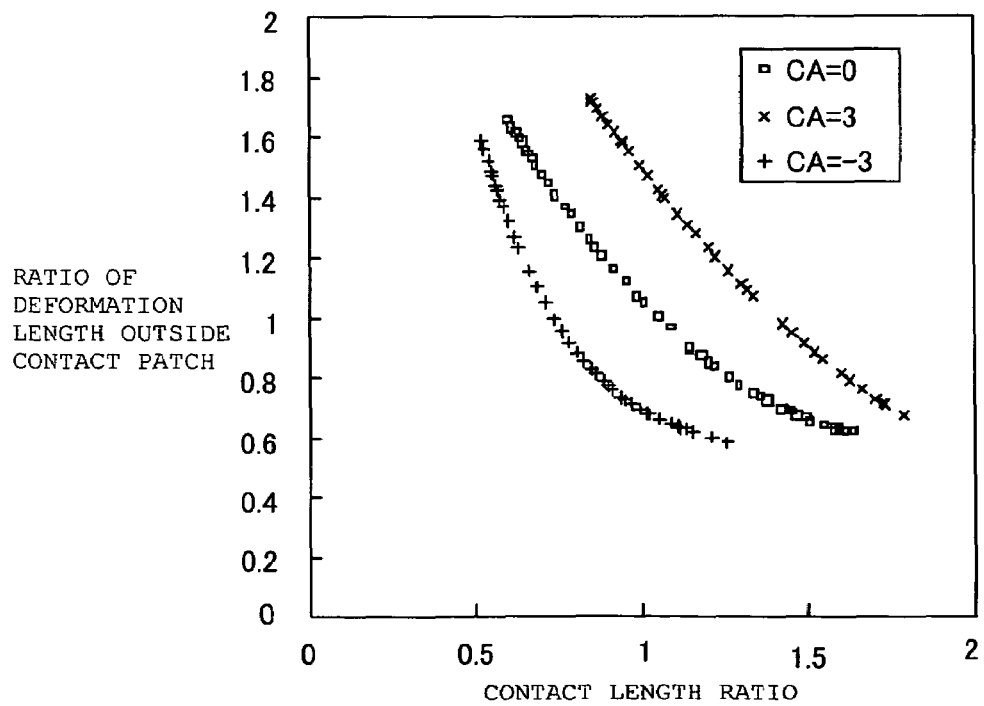
FIG. 11 is a graph showing the relationship between the ratio of contact lengths and the ratio of deformation lengths outside the contact patch.

The relationship between the ratio R of contact length indices and lateral force greatly changes according to the angle (camber angle) of the tire with respect to the road surface. FIG. 10 is a graph showing the relationship between lateral force and contact length ratio when a vehicle equipped with the tire 20 with sensors comprising the tire deformation amount measuring means 11A and 11B installed on the inner liner portion 22 is caused to run at a speed of 60 km/hr, the load is fixed to 5 kN, and the slip angle is changed continuously by using a flat belt tester. FIG. 11 is a graph showing the relationship between the contact length ratio and the deformation length ratio outside the contact patch. The test road surface is a safety walk surface, the size of the tire is 225/55R17, and the inside pressure is 230 MPa.

The contact length ratio is the ratio of contact lengths obtained by time differentiating the strain waveforms of the tire deformation amount measuring means 11A and 11B and multiplying the time between their peaks by the wheel speed as described above. To obtain the contact length ratio, the camber angle is set to 0°, +3° and −3°.

Although the contact length ratio and the lateral force show a good relationship at the above camber angles as understood from the graph of FIG. 10, when the camber angle changes, the relationship between the contact length ratio and the lateral force shifts. For example, when lateral force is nil and the camber angle is 0°, the contact length ratio is 1 and when the camber angle is +3°, the contact length ratio is about 1.3. That is, since the twisting degree of the tire differs by the slip angle and the camber angle for the same contact shape, generated lateral force differs. Therefore, though it is necessary to correct lateral force obtained from the contact length ratio by estimating the camber angle, the detection of the camber angle is generally difficult.

However, the contact length ratio R detected from the time between the contact ends shown by the black circles in FIG. 3 and the deformation length ratio S outside the contact patch detected from the time between deformation points outside the contact patch before and after the contact patch shown by the white circles change according to the camber angle as shown in FIG. 11. Therefore, when a map showing the relationship between the contact length ratio and the deformation length ratio outside the contact patch is prepared by using the twisting degree of the tire as an index to estimate the camber angle so as to correct lateral force obtained from the above contact length ratio R, lateral force generated in the tire 20 with sensors can be estimated accurately.

Figure 12:
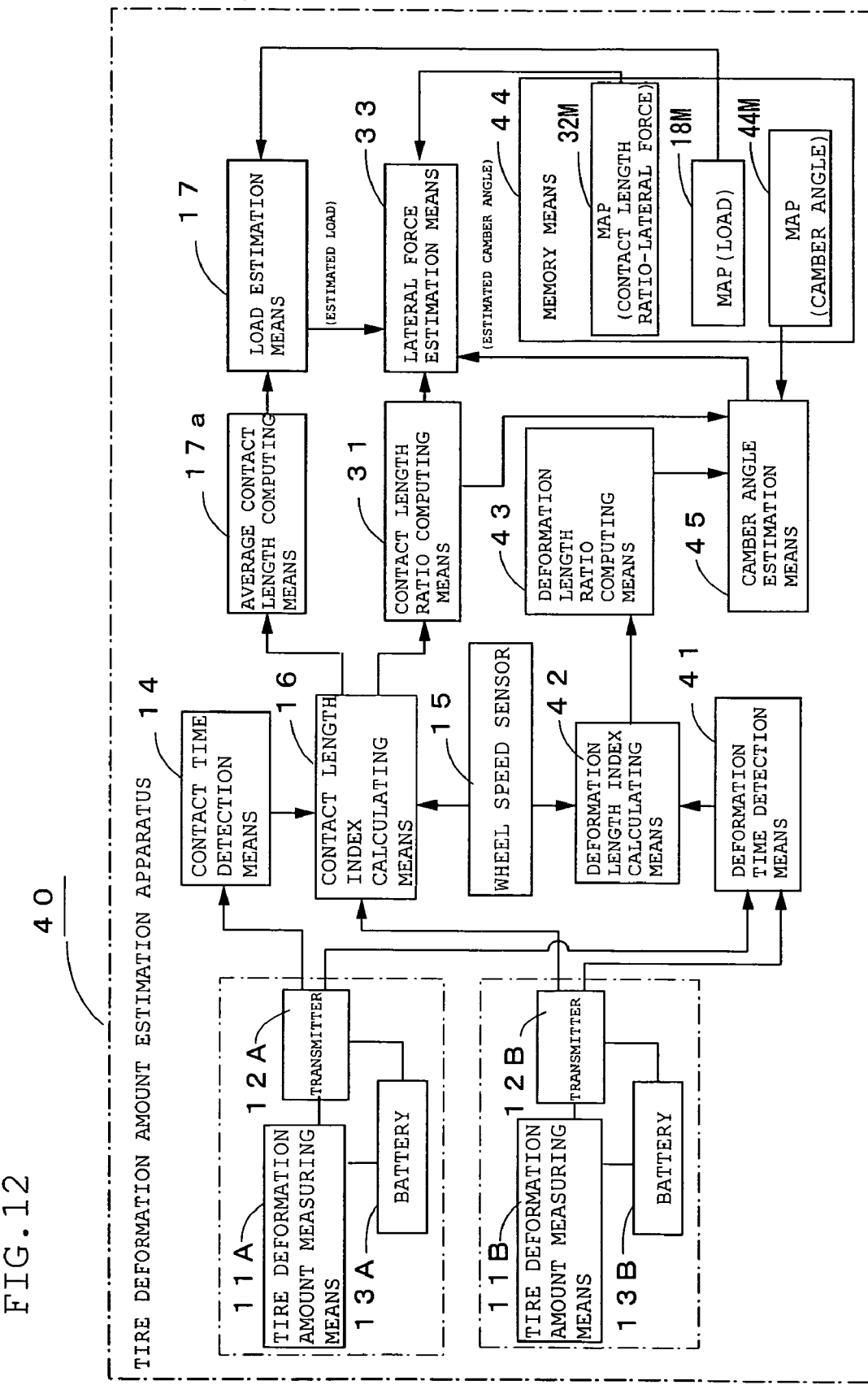
FIG. 12 is a functional block diagram showing the constitution of another tire dynamic state amount estimation apparatus according to the present invention.

FIG. 12 is a block diagram showing a tire dynamic state amount estimation apparatus 40 having means of correcting the estimated value of lateral force estimated in the above Embodiment 2. This estimation apparatus 40 comprises deformation time detection means 41 for detecting the time between deformation points outside the contact patch of the tire from the temporal waveform of the deformation amount of the inner liner portion 22, the temporal waveform of a differential value obtained by time differentiating the above deformation amount, or the temporal waveform of an integrated value obtained by time integrating the above deformation amount, and deformation length index calculation means 42 for calculating the index of deformation length outside the contact patch by multiplying the detected time between the deformation points outside the contact patch by the wheel speed detected by the wheel speed sensor 15 in addition to the contact time detection means 14 and the contact length index calculation means 16. The estimation apparatus 40 estimates the camber angle from the ratio of the indices of deformation length outside the contact patch calculated by the deformation length index calculation means 42 and the ratio of contact length indices to correct the above estimated value of lateral force with the estimated camber angle. Stated more specifically, deformation length ratio computing means 43 for computing the ratio of the indices of deformation length outside the contact patch calculated by the above deformation length index calculation means 42 is provided and camber angle estimation means 45 for estimating the camber angle by using the above computed ratio of the indices of deformation length outside the contact patch, the ratio of contact length indices computed by the contact length computing means 31 and a map 44M showing the relationship among the ratio of contact length indices, the ratio of the indices of deformation length outside the contact patch and the camber angle pre-stored in the memory means 44 is provided to estimate the camber angle. In this tire dynamic state amount estimation apparatus 40, the above load estimation map 18M, the lateral force estimation map 32M and the camber angle estimation map 44M are stored in the memory 44.

In the above tire dynamic state amount estimation apparatus 40, average contact length computing means 17a is used to compute the average value k of contact length indices $k_A$ and $k_B$, which is carried out by the load estimation means 17 in the tire dynamic state amount estimation apparatuses 10 and 30, and this computed average value k of contact length indices is supplied to the load estimation means 17. The above average contact length calculation means 17a may be provided in the load estimation means 17. Means of obtaining the average value of the indices of deformation length outside the contact patch calculated by the above deformation length index calculation means may be provided in place of the above average contact length computing means 17a to supply the average value of the indices of deformation length outside the contact patch to the load estimation means 17 so as to estimate a load applied to the tire.

FIG. 11 shows the relationship between the contact length ratio and the ratio of the indices of deformation length outside the contact patch by changing the slip angle continuously. Therefore, not only the camber angle but also the slip angle can be estimated by using FIG. 11.

Further, when the attitude angles of the four wheels are known, the inclination of the road surface can be estimated in addition to the attitude angles of the wheels. When this information is applied to the control of the attitude of the vehicle, the running stability of the vehicle can be improved.

Thus, the feature of the present invention which cannot be achieved by detection using an acceleration sensor is that information on the deformation amount of the tire outside the contact patch is obtained and utilized.

Figure 13:
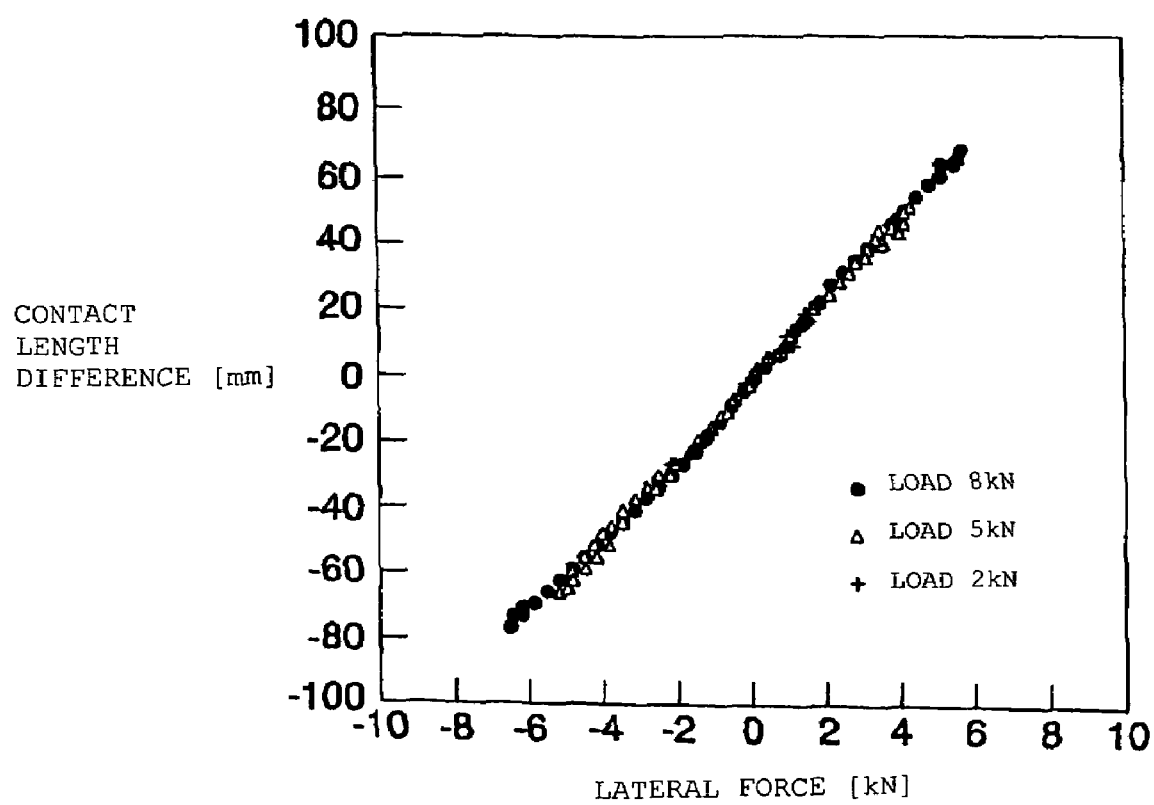
FIG. 13 is a graph showing the relationship between lateral force and the difference of contact length.

In the above Embodiment 2, lateral force generated in the tire 20 with sensors is estimated from the ratio $R=k_A/k_B$. It is possible to estimate lateral force from the difference $S=k_A-k_B$ between the contact length indices $k_A$ and $k_B$. That is, as shown in FIG. 13, the difference S between the contact length indices $k_A$ and $k_B$ of two points located on both sides of the center in the axial direction of the tire of the tire tread surface shows a good relationship like the ratio R of contact length indices, and this relationship remains almost unchanged even when the load changes. Therefore, as shown in FIG. 14, a tire dynamic state amount estimation apparatus 50 comprising contact length difference computing means 51 for computing the difference S between contact length indices $k_A$ and $k_B$ calculated by the contact length index calculation means 16 and lateral force estimation means 53 for estimating lateral force generated in the tire 20 with sensors by using a map 52M showing the relationship between the contact length difference S and the size of lateral force pre-stored in the memory 52 is constructed to estimate lateral force generated in the tire without correcting the load.

Figure 14:
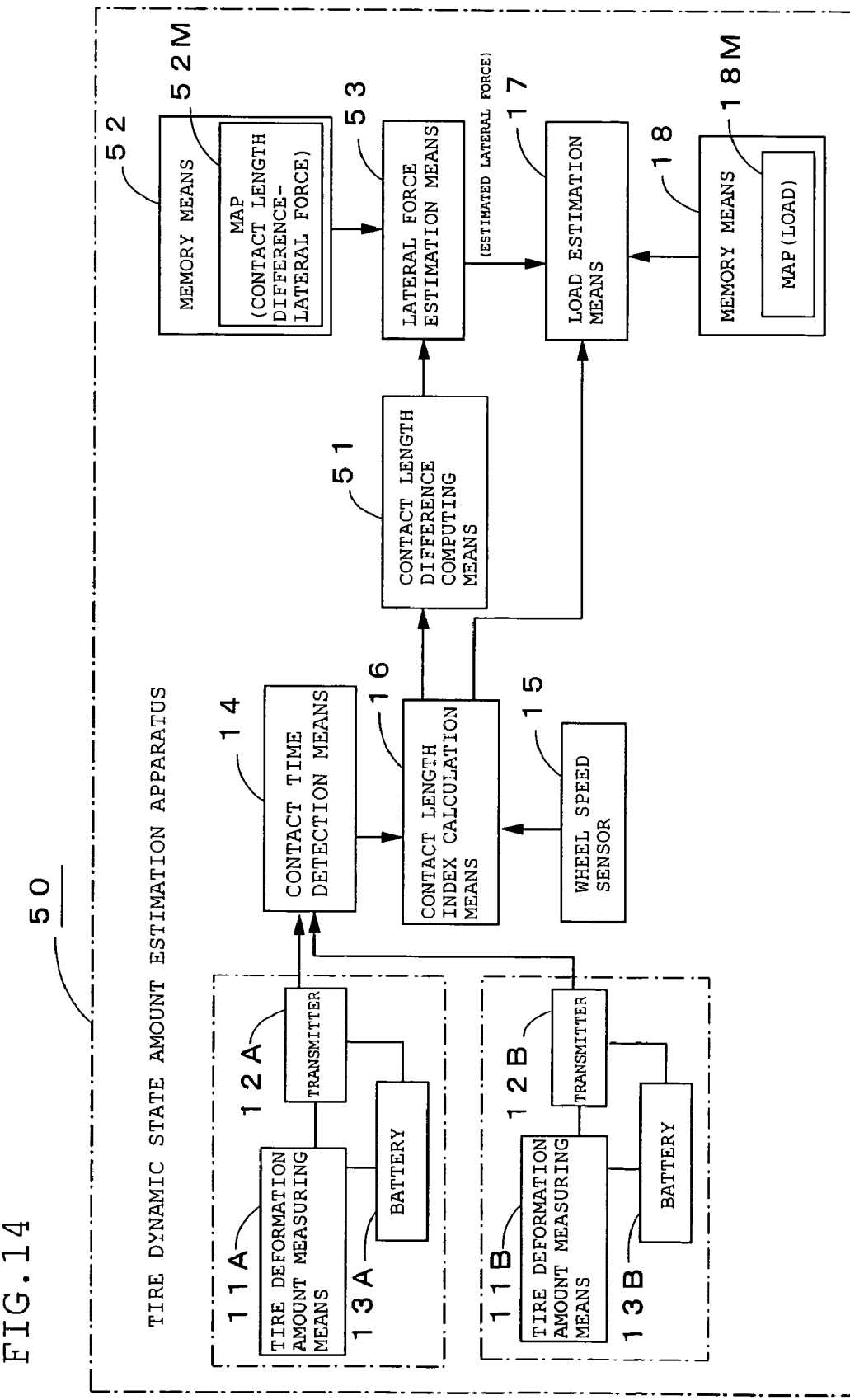
FIG. 14 is a functional block diagram showing the constitution of still another tire dynamic state amount estimation apparatus according to the present invention.

Although a load applied to the tire changes according to lateral force generated in the tire, since the above tire dynamic state amount estimation apparatus 50 can estimate lateral force generated in the tire regardless of the size of the load, when the estimated value of the load estimated by the load estimation means 17 is corrected by the estimated value of lateral force estimated by the above lateral force estimation means 53 as shown in FIG. 14, the estimated value of the load when lateral force is generated can be corrected. That is, although the average contact length and the load show an extremely good relationship in the normal use area, when lateral force becomes large close to the tire critical area, the average contact length tends to become slightly large with the same load. Then, when the relationship between lateral force and the average contact length k during the application of a load is obtained in advance and a load applied to the tire is corrected by the above estimated value of lateral force and the average contact length k, the estimation accuracy of the load can be further improved.

Figure 15:
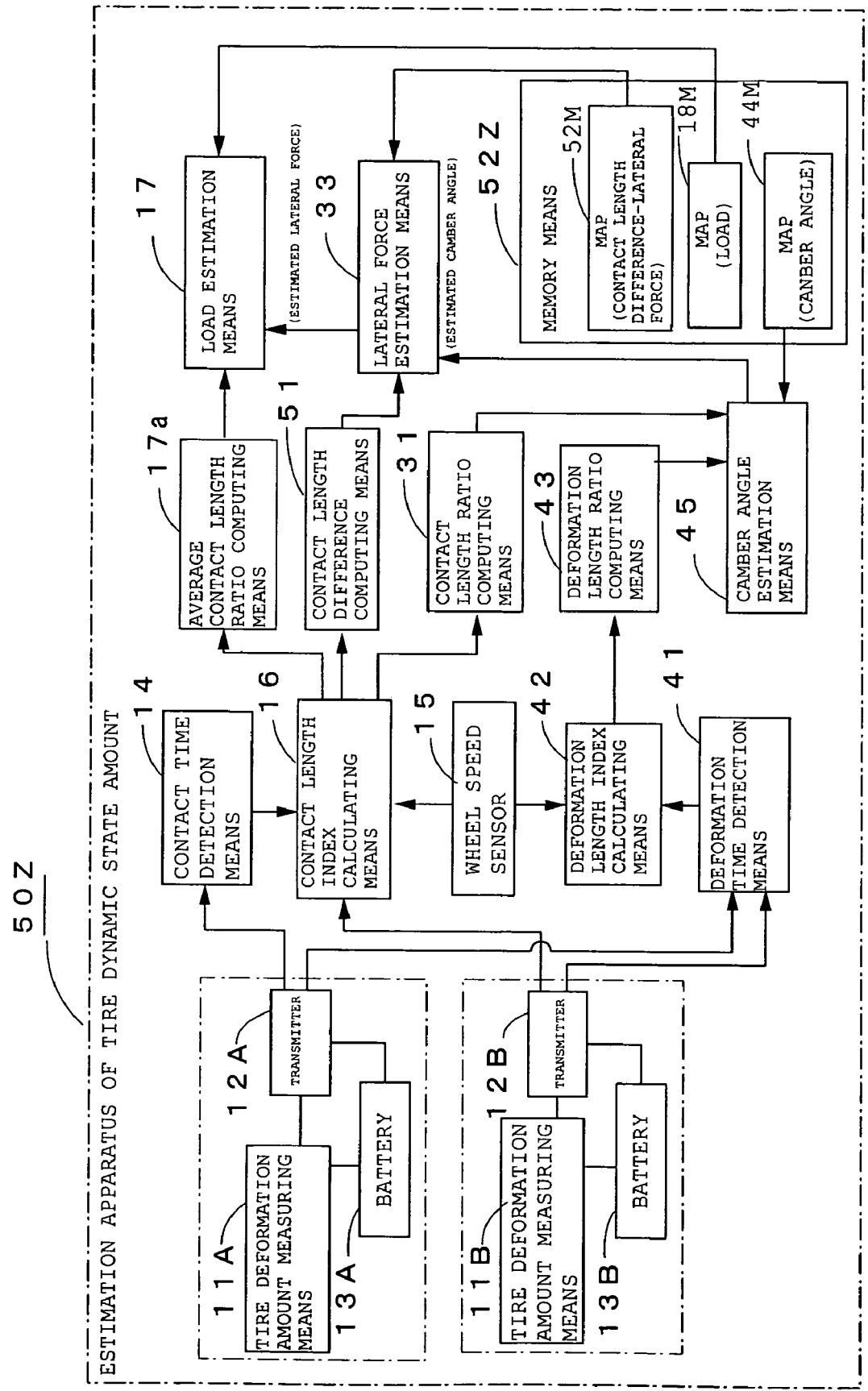
FIG. 15 is a functional block diagram showing the constitution of a further tire dynamic state amount estimation apparatus according to the present invention.

Since the size of lateral force changes according to the camber angle, when a tire dynamic state amount estimation apparatus 50Z is constructed by adding the deformation time detection means 41, deformation length index calculation means 42, deformation length ratio computing means 43 and camber angle estimation means 45 used in the tire dynamic state amount estimation apparatus 40 shown in FIG. 12 to the above tire dynamic state amount estimation apparatus 50 as shown in FIG. 15 to estimate the camber angle so as to correct lateral force estimated from the above contact length difference by using this estimated camber angle, the accuracy of the estimated value of lateral force can be further improved.

In the above tire dynamic state amount estimation apparatus 50Z, the above load estimation map 18M, the lateral force estimation map 52M and the camber angle estimation map 44M are stored in the memory 52Z.

In the above Embodiments 1 and 2, strain gauges are used as the tire deformation amount measuring means 11A and 11B. A conductive rubber may be used in place of the strain gauge. That is, as the sensor portion of the above strain gauge is made of a metal material, the conductive rubber is advantageous when durability against repeated use is taken into consideration.

The volume resistance under no load of the above conductive rubber is preferably set to $10^7$ to $10^9$ Ωm. This is because when the volume resistance is lower than $10^7$ Ωm, the consumption power becomes large and the temperature rises, thereby reducing the detection efficiency. When the volume resistance is higher than $10^9$ Ωm, a current tends to flow in the surrounding rubber material, thereby reducing the detection accuracy. Therefore, the volume resistance under no load of the conductive rubber is preferably set to $10^7$ to $10^9$ Ωm. When the above conductive rubber is covered with rubber having a resistance 100 times and more that of the rubber of the tire, the upper limit of volume resistance can be raised.

Figure 16:
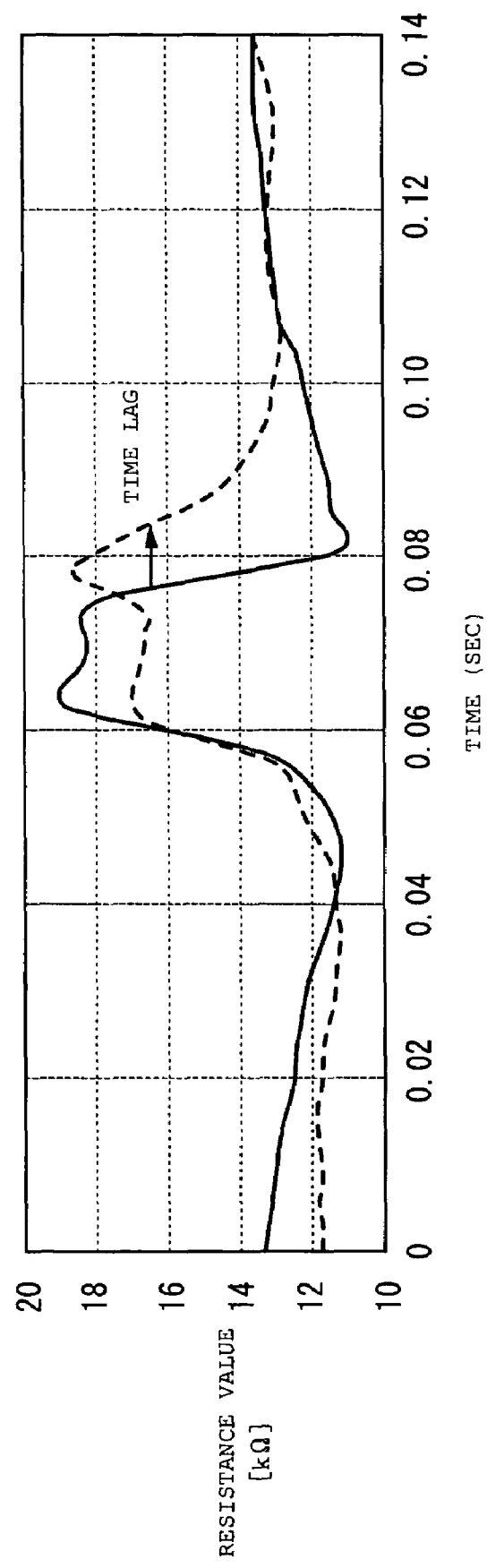
FIG. 16 is a graph showing the waveform of resistance when a conductive rubber is used as a sensor.

The conductive rubber has a hysteresis loss. Since the phase of the strain waveform is delayed when this hysteresis loss becomes large, a conductive rubber which has a tan δ smaller than 0.1 must be used as the above conductive rubber. FIG. 16 shows the waveform of strain when the conductive rubber is used as the tire deformation amount measuring means 11A and 11B. The solid line in FIG. 16 shows a conductive rubber having a small loss (tan δ<0.1) and the broken line shows a conductive rubber having a large loss (tan δ=0.22). When the conductive rubber having a large loss, the contact point or the deformation point may shift in position and it is difficult to definitely specify the position of the contact point or the deformation point. When the conductive rubber having a small loss is used, the waveform of strain has a clear contact point or deformation point like when the above strain gauge is used, thereby making it possible to calculate the contact length and the deformation length without fail.

Since the detection accuracy lowers when the conductive rubber is thick, the upper limit of the thickness of the above conductive rubber is preferably 2 mm. The length in the detection direction of the sensor such as the strain gauge, the conductive rubber or a piezoelectric polymer which will be described hereinafter must be small, for example, 20 mm or less, whereby the position of the contact point or the deformation point can be definitely specified (as the length in the direction perpendicular to the detection direction of the sensor is smaller than that in the detection direction, there is no problem).

In the above embodiment, the sensor for detecting a change in electric resistance, such as a strain gauge or a conductive rubber is used as the tire deformation amount measuring means 11A and 11B. A piezoelectric polymer (piezoelectric film or piezoelectric cable having a certain length) may be used. The above piezoelectric polymer generates charge equivalent to the amount of strain. Therefore, a change in strain in the circumferential direction, that is, an output equivalent to the differential value of the output waveform of the above strain sensor is obtained. Consequently, when the piezoelectric polymer is used as the tire deformation amount measuring means 11A and 11B, the peaks of the contact ends appear in its output waveform, whereby the contact time can be easily estimated without carrying out the differential operation.

A piezoelectric film is preferably used as the above piezoelectric polymer, and a PVDF (polyvinylidene fluoride) film which generates a large voltage by strain and has excellent durability is particularly preferred. To ensure a sufficient SN ratio as the output of tire strain, the piezoelectric voltage coefficient of the above piezoelectric film must satisfy |g31|>0.05 Vm/N.

Figure 17:
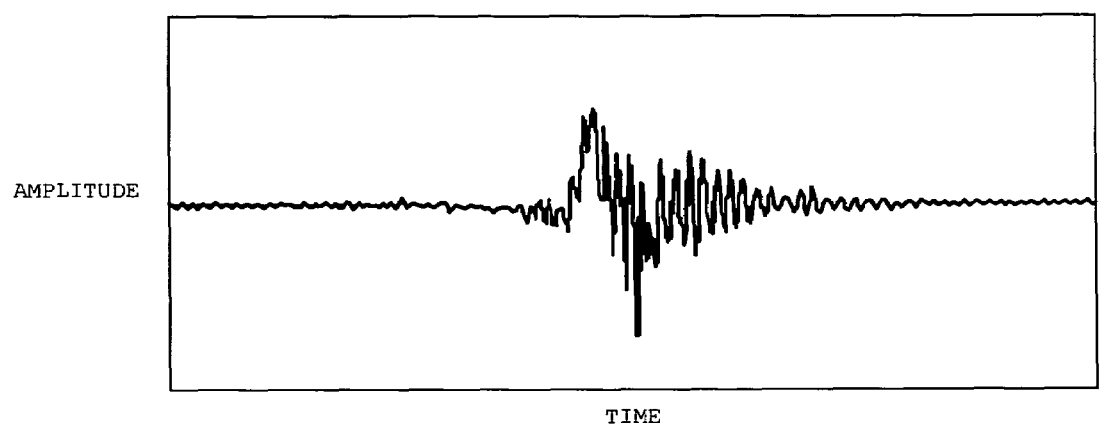
FIGS. 17(a) and 17(b) are graphs showing the wavelength of output voltage when a piezoelectric film is used as the sensor.
Figure 17:
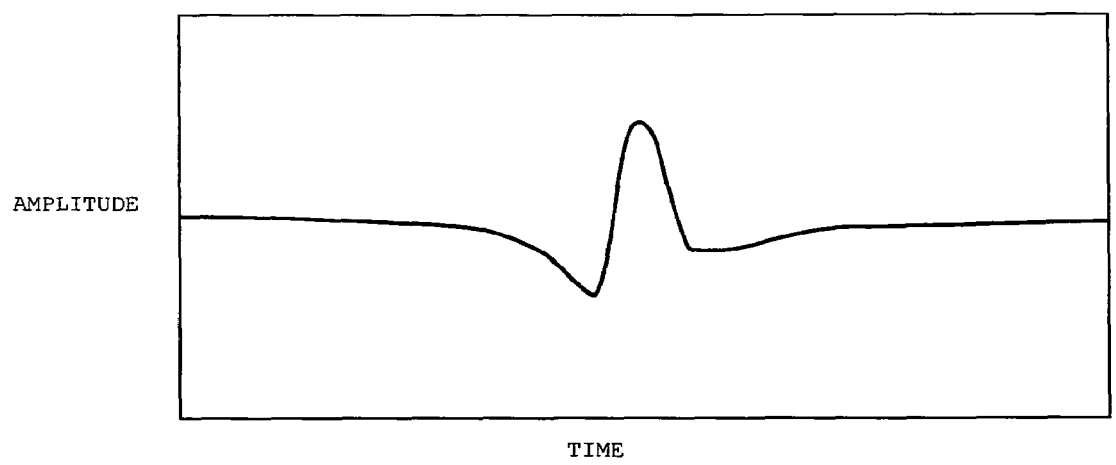

FIG. 17(a) shows the waveform of generated voltage when a PVDF film is used as the tire deformation amount measuring means 11A and 11B, and FIG. 17(b) shows its integrated waveform. Since the position of the contact point or the deformation point can be definitely specified by using a PVDF film having a large strain output, a load applied to the tire and lateral force generated in the tire can be estimated accurately.

When a piezoelectric film having temperature characteristics that the reduction rate of the piezoelectric voltage coefficient value at 120° C. from the piezoelectric voltage coefficient value at 25° C. is 30% or less is used as the above piezoelectric film, the high-temperature stability of the sensor can be ensured, thereby making it possible to estimate a load and lateral force even at a high temperature. The piezoelectric film can be obtained by annealing a piezoelectric film. The above annealing temperature which differs according to the composition of the piezoelectric film is suitably about 125° C. in the case of the above PVDF film.

The above piezoelectric polymer is advantageous over the above strain gauge because power saving is possible as only the circuit portion consumes power and it has excellent durability as it is flexible.

Embodiment 3

Lateral force generated in the tire 20 with sensors is estimated from the ratio R of contact length indices and the ratio of the indices of deformation length outside the contact patch in the above Embodiment 2. It is possible to estimate longitudinal force generated in the above tire from the ratio Z of the indices of deformation length before and after the contact patch as will be described hereinafter.

The ratio Z of the indices of deformation length before and after the contact patch is obtained by calculating the lengths between the deformation points outside the contact patch shown by the white circles in FIG. 3 and the contact ends shown by the black circles on the front side of the contact patch (tread side) and the rear side of the contact patch (kick side). Since longitudinal force and the ratio of the indices of deformation length before and after the contact patch show a very good relationship as will be described hereinafter, a map showing the relationship between longitudinal force and the ratio Z of the indices of deformation length before and after the contact patch is prepared and used to estimate longitudinal force generated in the tire.

Figure 18:
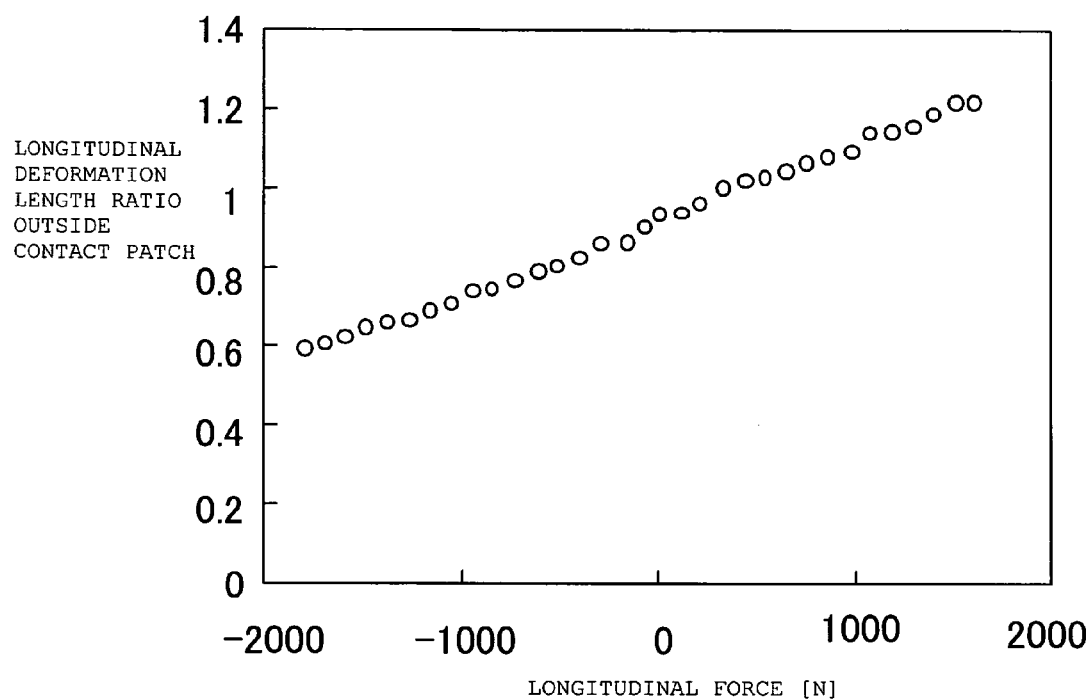
FIG. 18 is a diagram showing the relationship between longitudinal force and the average value of the ratio of deformation lengths before and after the contact patch of both shoulder portions.

FIG. 18 is a graph showing the relationship between longitudinal force and the average value of the ratio of the indices of deformation length before and after the contact patch of both shoulder portions when a vehicle equipped with the tire 20 with sensors comprising the tire deformation amount measuring means 11A and 11B installed on the inner liner portion 22 is caused to run at a speed of 60 km/hr by using a flat belt tester. The slip angle is fixed to 0° and only longitudinal force is continuously changed. The road surface is a safety walk surface, the size of the tire is 225/55R17, and the inside pressure is 230 MPa. When longitudinal force applied to the tire is to be obtained by using a map showing the relationship between the ratio of the indices of deformation length before and after the contact patch and longitudinal force which has been prepared based on the above data, even if lateral force is generated, longitudinal force applied to the tire can be estimated accurately.

Figure 19:
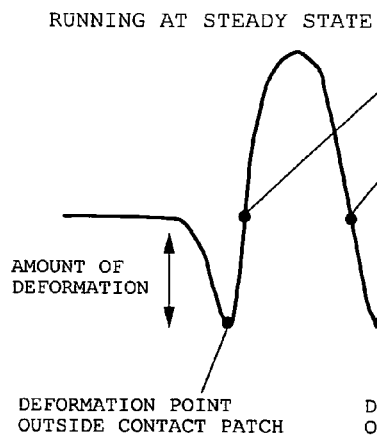
FIGS. 19(a) and 19(b) are graphs showing changes in the waveform of deformation of the inner surface of the tread caused by longitudinal force.
Figure 19:
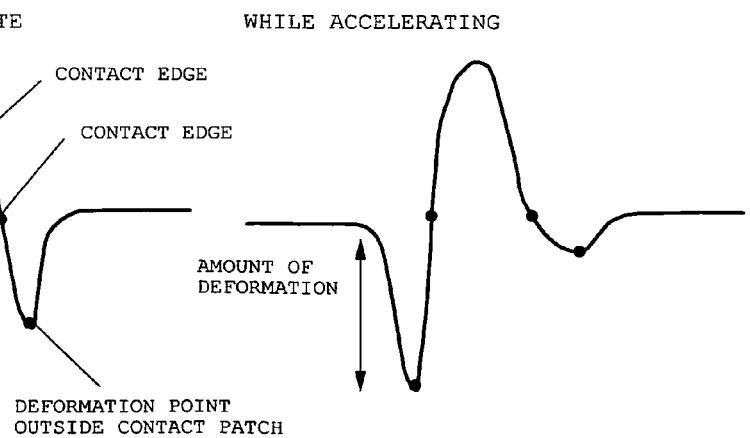

In the above embodiment, longitudinal force is estimated from the ratio of the indices of deformation length before and after the contact patch. As the amount of deformation on the front side (tread side) of the contact patch caused by the strain of the inner surface of the tread differs from the amount of deformation on the rear side (kick side) of the contact patch when longitudinal force is applied as shown in FIGS. 19(a) and 19(b), longitudinal force can be estimated by comparing the amount of deformation on the tread side with that on the kick side.

Since the deformation amount of the tire on the inner side of the inner liner portion 22, between the inner liner and the ply, between belts or between the ply and the belt changes according to the inside pressure and temperature of the tire, the inside pressure and temperature of the tire are measured separately and the above wheel speed and the estimated values of the above load, lateral force and longitudinal force are corrected with the measurement data, thereby making it possible to further improve the estimation accuracy.

EXAMPLE

A tire with sensors having a size of 185/70R14 was prepared to confirm the difference of signal detection stability between the strain sensors and the acceleration sensors when the unevenness of the road surface and a low speed were input. The positions of the sensors were the same as in FIG. 2, and the strain sensors and the acceleration sensors were mounted in the circumferential direction with one block interposed therebetween. A piezoelectric acceleration sensor was used as the acceleration sensors and mounted to measure acceleration in the circumferential direction of the tire. The tire having these sensors was attached to the front left wheel of a 1,800 cc passenger car, and a slalom test was carried out at a running speed of 20 km/hr with a small steering angle. The inside pressure of the above tire was 200 kPa.

As a result of the test, a peak at the contact ends was not sufficiently large and therefore, the contact length could not be detected stably with the acceleration sensors.

Figure 20:
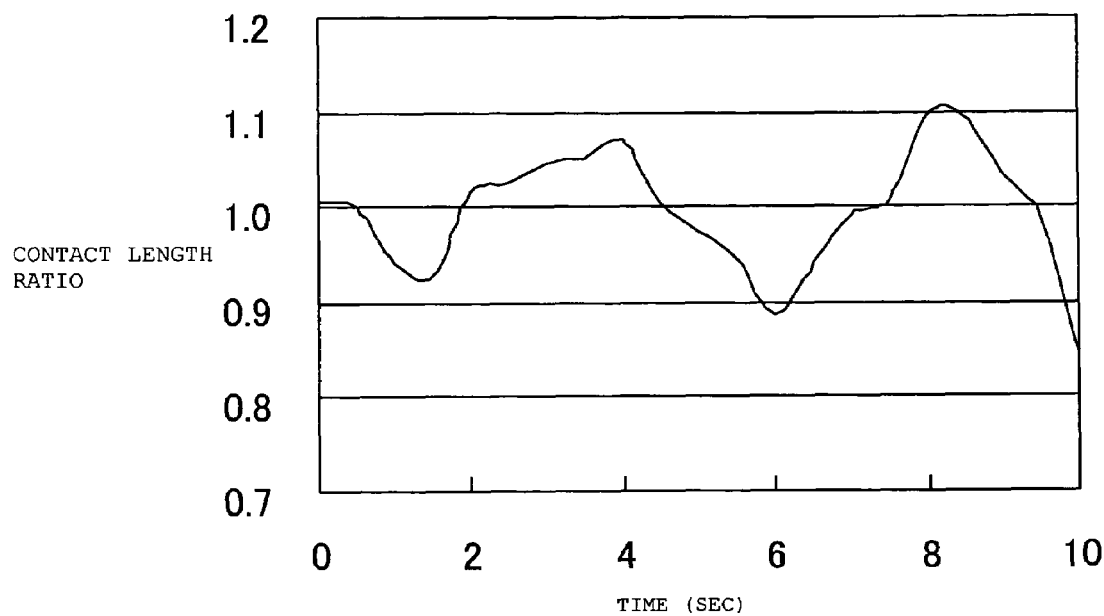
FIGS. 20(a) and 20(b) are graphs showing the time sequence waveform of the contact length ratio and the time sequence waveform of the average contact length estimated from the outputs of strain sensors.
Figure 20:
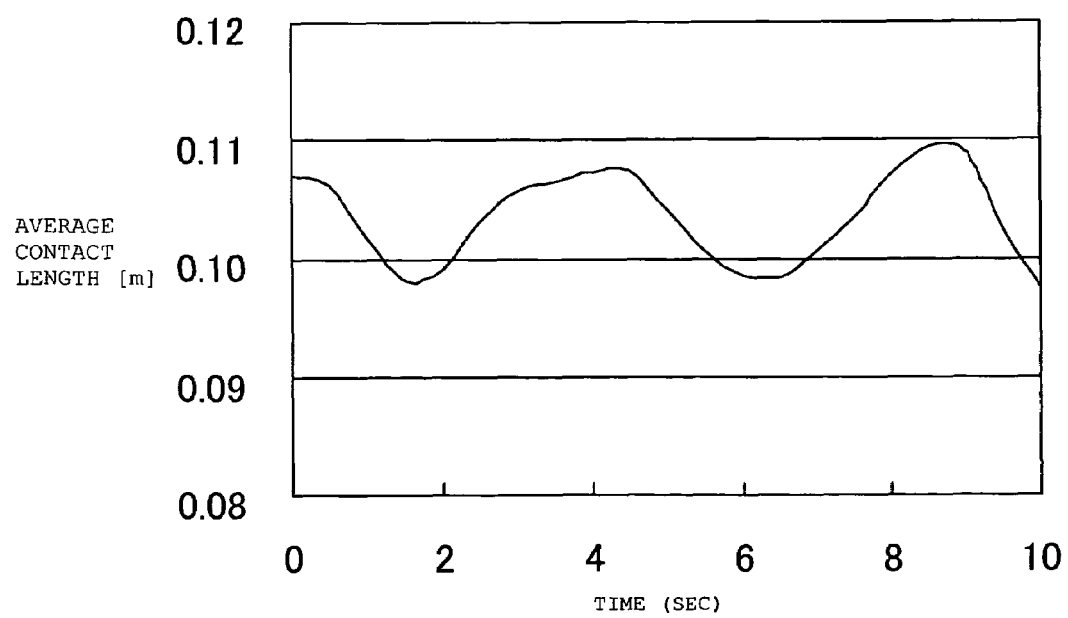

In contrast to this, stable detection could be carried out with the strain sensors, and the detection values of the contact length ratio and the average contact length could be obtained. FIG. 20(a) shows the time sequence waveform of the contact length ratio detected from the outputs of the strain sensors and FIG. 20(b) shows the time sequence waveform of the average contact length. Thereby, it was confirmed that the contact length at the time of running at a low speed which cannot be detected with the acceleration sensors can be detected accurately with the strain sensors.

INDUSTRIAL FEASIBILITY

As described above, according to the present invention, the dynamic state amount of the tire can be estimated stably and accurately when a load, lateral force or longitudinal force is applied to the tire while running. Therefore, the running stability of the vehicle can be significantly improved by feeding back the above information to the control of the vehicle.

What is claimed is:

1. A method of estimating the dynamic state amount of a tire when one or more of a load, lateral force and longitudinal force are generated in the tire while running by measuring the amount of deformation at two or more portions on an inner liner or between a belt and the inner liner, which exist on a reverse side of the tire tread and are on almost the same cross-section in the radial direction of the tire, and a wheel speed.

2. The method of estimating the dynamic state amount of a tire according to claim 1, wherein the amount of deformation is any one of the amount of deformation at the inner surface of an inner portion, amount of deformation between the inner liner and a ply, amount of deformation between plies or amount of deformation between the ply and a belt.

3. The method of estimating the dynamic state amount of a tire according to claim 1, wherein the amount of deformation is strain in the circumferential direction of the tire, or a change amount of strain in the circumferential direction, or out-of-plane bending strain of a tread portion in the circumferential direction or shear strain.

4. The method of estimating the dynamic state amount of a tire according to claim 1, wherein the amount of deformation is strain in the lateral direction of the tire, a change amount of strain in the lateral direction, bending strain of the tread portion in the lateral direction or shear strain.

5. The method of estimating the dynamic state amount of a tire according to claim 1, wherein the contact length or deformation length of the tire is calculated from the amount of deformation, and the dynamic state amount of the tire is estimated based on the calculated contact length or deformation length.

6. The method of estimating the dynamic state amount of a tire according to claim 5, wherein the dynamic state amount for estimating the dynamic state of the tire is a load applied to the tire.

7. The method of estimating the dynamic state amount of a tire according to claim 6, wherein the contact time of the tire is detected from the temporal waveform of the amount of deformation at two or more positions, or the temporal waveform of a differential value obtained by time differentiating the amount of deformation, or the temporal waveform of an integrated value obtained by time integrating the amount of deformation, the indices of contact length are calculated by multiplying the detected contact time by the wheel speed, and a load applied to the tire is estimate by the average value of the indices of contact length.

8. The method of estimating the dynamic state amount of a tire according to claim 6, wherein the time between deformation points outside the contact patch of the tire is detected from the temporal waveform of the amount of deformation at two or more positions, or the temporal waveform of a differential value obtained by time differentiating the amount of deformation, or the temporal waveform of an integrated value obtained by time integrating the amount of deformation, the indices of deformation length outside the contact patch are calculated by multiplying the detected time between deformation points outside the contact patch by the wheel speed, and a load applied to the tire is estimate by the average value of the indices of deformation length outside the contact patch.

9. The method of estimating the dynamic state amount of a tire according to claim 7, wherein the positions for measuring the amount of deformation include at least two axisymmetrical positions which are equally distant in the axial direction from the center in the axial direction of the tire on almost the same cross-section in the radial direction of the tire.

10. The method of estimating the dynamic state amount of a tire according to claim 5, wherein the contact time of the tire is detected from the temporal waveform of the amount of deformation at axisymmetrical positions which are equally distant in the axial direction from the center in the axial direction of the tire on almost the same cross-section in the radial direction of the tire, or the temporal waveform of a differential value obtained by time differentiating the amount of deformation, or the temporal waveform of an integrated value obtained by time integrating the amount of deformation, the indices of tire contact length are calculated by multiplying the detected contact time by the wheel speed, the time between deformation points outside the contact patch of the tire is detected from any one of the temporal waveforms, the indices of deformation length outside the contact patch are calculated by multiplying the time between deformation points outside the contact patch by the wheel speed, and the posture angle of the tire is estimated from the indices of contact length and the indices of deformation length outside the contact patch.

11. The method of estimating the dynamic state amount of a tire according to claim 5, wherein the dynamic state amount for estimating the dynamic state of the tire is lateral force generated in the tire.

12. The method of estimating the dynamic state amount of a tire according to claim 11, wherein the contact time of the tire is detected from the temporal waveform of the amount of deformation at axisymmetrical positions which are equally distant in the axial direction from the center in the axial direction of the tire on almost the same cross-section in the radial direction of the tire, or the temporal waveform of a differential value obtained by time differentiating the amount of deformation or the temporal waveform of an integrated value obtained by time integrating the amount of deformation, the indices of tire contact length are calculated by multiplying the detected contact time by the wheel speed, and lateral force generated in the tire is estimated from the ratio of the indices of contact length at the axisymmetrical positions.

13. The method of estimating the dynamic state amount of a tire according to claim 12, wherein the average value of the indices of contact length or the indices of deformation length outside the contact patch at axisymmetrical positions is calculated, a load is estimated from the average value of the indices of contact length or the indices of deformation length outside the contact patch, and lateral force estimated from the ratio of the indices of contact length is compensated by this estimated load.

14. The method of estimating the dynamic state amount of a tire according to claim 13, wherein the time between deformation points outside the contact patch of the tire is detected from the temporal waveform of the amount of deformation at axisymmetrical positions, or the temporal waveform of a differential value obtained by time differentiating the amount of deformation or the temporal waveform of an integrated value obtained by time integrating the amount of deformation, the indices of deformation length outside the contact patch are calculated by multiplying the detected time between deformation points outside the contact patch by the wheel speed to obtain the ratio of the indices of deformation length outside the contact patch, the posture angle of the tire is estimated from the ratio of the indices of deformation length outside the contact patch and the ratio of the indices of contact length, a load is estimated from the average value of the indices of contact length or the indices of deformation length outside the contact patch and lateral force estimated from the ratio of indices of contact length is corrected by the estimated posture angle and the estimated load.

15. The method of estimating the dynamic state amount of a tire according to claim 11, wherein the contact time of the tire is detected from the temporal waveform of the amount of deformation at axisymmetrical positions which are equally distant in the axial direction from the center in the axial direction of the tire on almost the same cross-section in the radial direction of the tire, or the temporal waveform of a differential value obtained by time differentiating the amount of deformation, or the temporal waveform of an integrated value obtained by time integrating the amount of deformation, the indices of contact length of the tire are calculated by multiplying the detected contact time by the wheel speed, and lateral force generated in the tire is estimated from the difference between the indices of contact length at the axisymmetrical positions.

16. The method of estimating the dynamic state amount of a tire according to claim 15, wherein the time between deformation points outside the contact patch of the tire is detected from the temporal waveform of the amount of deformation at axisymmetrical positions, or the temporal waveform of a differential value obtained by time differentiating the amount of deformation, or the temporal waveform of an integrated value obtained by time integrating the amount of deformation, the indices of deformation length outside the contact patch are calculated by multiplying the detected time between the deformation points outside the contact patch by the wheel speed to obtain the ratio of the indices of deformation length outside the contact patch, the posture angle of the tire is estimated from the ratio of the indices of deformation length outside the contact patch and the ratio of the indices of contact length, and lateral force estimated from the difference between the indices of contact length is compensated by the estimated posture angle.

17. The method of estimating the dynamic state amount of a tire according to claim 7, wherein the estimated value of load is compensated by the estimated value of lateral force estimated from the difference between the indices of contact length.

18. The method of estimating the dynamic state amount of a tire according to claim 5, wherein the dynamic state amount for estimating the above dynamic state is longitudinal force generated in the tire.

19. The method of estimating the dynamic state amount of a tire according to claim 18, wherein the amounts of deformation at deformation points outside the contact patch of the tire, which are located before and after the contact patch, are detected from the temporal waveform of the amount of deformation, or the temporal waveform of a differential value obtained by time differentiating the amount of deformation or the temporal waveform of an integrated value obtained by time integrating the amount of deformation to obtain the ratio of the amounts of deformation outside the contact patch, and longitudinal force generated in the tire is estimated from the ratio of the amounts of deformation outside the contact patch.

20. The method of estimating the dynamic state amount of a tire according to claim 19, wherein the ratios of the amounts of deformation outside the contact patch of at least two positions are calculated, and longitudinal force generated in the tire is estimated from the average value of the ratios.

21. The method of estimating the dynamic state amount of a tire according to claim 18, wherein the length of deformation on the leading edge side is calculated by multiplying the time between the deformation point outside the contact patch on the leading edge side and the leading edge of contact patch by the wheel speed, the length of deformation on the trailing edge side is calculated by multiplying the time between the deformation point outside the contact patch on the trailing edge side and the trailing edge of contact patch by the wheel speed, and longitudinal force applied to the tire is estimated from the ratio of them or the difference between them.

22. The method of estimating the dynamic state amount of a tire according to claim 21, wherein the ratio or difference between the length of deformation on the leading edge side and the length of deformation on the trailing edge side of at least two positions is calculated, and longitudinal force generated in the tire is estimated from the average value of them.

23. The method of estimating the dynamic state amount of a tire according to claim 19, wherein the points for measuring the amount of deformation include at least axisymmetrical positions which are equally distant in the axial direction from the center in the axial direction of the tire on almost the same cross-section in the radial direction of the tire.

24. The method of estimating the dynamic state amount of a tire according to claim 1, wherein either one or both of the inside pressure and inside temperature of the wheel portion or the tire are detected, and the wheel speed and the estimated value of any load, lateral force or longitudinal force are compensated by the inside pressure or temperature, or both the inside pressure and temperature.

25. A tire with sensors for estimating the dynamic state amount of the tire while running, wherein a plurality of sensors for measuring the amount of deformation of the tire are installed at two or more portions on an inner liner or between a belt and the inner liner, which exist on a reverse side of the tire tread and are almost the same cross-section in the radial direction of the tire.

26. The tire with sensors according to claim 25, wherein the sensors are installed at the inner surface of an inner liner portion, or between the inner liner and a ply, or between plies or between the ply and the belt.

27. The tire with sensors according to claim 26, wherein at least two of the sensors are installed at axisymmetrical positions which are equally distant in the axial direction from the center in the axial direction of the tire on almost the same cross-section in the radial direction of the tire.

28. The tire with sensors according to claim 25, wherein the sensors are for measuring strain in the circumferential direction or strain in the lateral direction of the tire.

29. The tire with sensors according to claim 25, wherein the sensors are for measuring a change in strain in the circumferential direction or a change in strain in the lateral direction of the tire.

30. The tire with sensors according to claim 25, wherein the sensors are for measuring bending strain in the circumferential direction or bending strain in the lateral direction of the tire.

31. The tire with sensors according to claim 25, wherein the sensors are for measuring shear strain in the circumferential direction or shear strain in the lateral direction of the tire.

32. The tire with sensors according to claim 28, wherein the distance between two sensors for measuring strain, a change in strain, bending strain or shear strain in the circumferential direction or the lateral direction is ½ or less of the maximum width of the tire.

33. The tire with sensors according to claim 28, wherein the sensor length in the detection direction is 20 mm or less.

34. The tire with sensors according to claim 25, wherein the sensors are bonded to the rubber portion of the tire by curing.

35. The tire with sensors according to claim 25, wherein the sensors are bonded to an inner liner rubber by an adhesive and covered with a rubber or a resin.

36. The tire with sensors according to claim 25, wherein the sensors are for measuring the amount of deformation from a change in electric resistance value.

37. The tire with sensors according to claim 36, wherein the sensors are strain gauges.

38. The tire with sensors according to claim 36, wherein the sensors are conductive rubbers.

39. The tire with sensors according to claim 38, wherein the volume resistivity of the conductive rubber under no load is $10^7$ to $10^9$ $\Omega$m.

40. The tire with sensors according to claim 38, wherein a conductive rubber having a tan $\delta$ smaller than 0.1 is used as the conductive rubber.

41. The tire with sensors according to claim 38, wherein the upper limit of the thickness of the conductive rubber is 2 mm.

42. The tire with sensors according to claim 38, wherein the conductive rubber is covered with a rubber having a resistance value 100 times or more larger than that of the conductive rubber.

43. The tire with sensors according to claim 25, wherein the sensors are for measuring the amount of deformation from a change in generated charge or generated voltage.

44. The tire with sensors according to claim 43, wherein the sensors are piezoelectric polymer films.

45. The tire with sensors according to claim 44, wherein the piezoelectric polymer films are PVDF films.

46. The tire with sensors according to claim 44, wherein the piezoelectric voltage coefficient of the piezoelectric polymer films is 0.05 Vm/N or more.

47. The tire with sensors according to claim 44, wherein the reduction rate of the piezoelectric voltage coefficient value at 120° C. from the piezoelectric voltage coefficient value at 25° C. of the piezoelectric polymer film is 30% or less.

48. An estimation apparatus of a tire dynamic state amount comprising;
   tire deformation amount detection means for measuring the amount of deformation of the tire, installed at two or more positions on almost the same cross-section in the radial direction of the tire at the inner surface of the inner liner portion of a tire tread or between the belt portion and the inner liner portion of the tire;
   a wheel speed sensor for detecting the wheel speed of the tire;
   contact time detection means for detecting the contact time of the tire based on the temporal waveform of the amount of deformation of the tire detected by the tire deformation amount measuring means, or the temporal waveform of a differential value obtained by time differentiating the amount of deformation, or the temporal waveform of an integrated value obtained by time integrating the amount of deformation;
   contact length index calculating means for calculating the indices of contact length from the contact time and the wheel speed detected by the wheel speed sensor;
   means of calculating the average value of the indices of contact length;
   memory means for storing a map showing the relationship between the average value of the indices of contact length and load; and
   load estimation means for estimating a load applied to the tire by using the calculated average value of the indices of contact length and the map.

49. An estimation apparatus of a tire dynamic state amount comprising;
   tire deformation amount detection means for measuring the amount of deformation of the tire, installed at two or more positions on almost the same cross-section in the radial direction of the tire at the inner surface of the inner liner portion of a tire tread or between the belt portion and the inner liner portion of the tire;
   a wheel speed sensor for detecting the wheel speed of the tire;
   means of detecting the time between deformation points outside the contact patch of the tire based on the temporal waveform of the amount of deformation of the tire detected by the tire deformation amount measuring means, the temporal waveform of a differential value obtained by time differentiating the amount of deformation, or the temporal waveform of an integrated value obtained by time integrating the amount of deformation;
   means of calculating the indices of deformation length outside the contact patch from the time between deformation points outside the contact patch and the wheel speed detected by the wheel speed sensor;
   means of calculating the average value of the indices of deformation length outside the contact patch;
   memory means for storing a map showing the relationship between the average value of the indices of deformation length outside the contact patch and load; and
   load estimation means for estimating a load applied to the tire by using the calculated average value of the indices of deformation length outside the contact patch and the map.

50. An estimation apparatus of a tire dynamic state amount comprising;
   tire deformation amount detection means for measuring the amount of deformation of the tire, installed at two or more positions on almost the same cross-section in the radial direction of the tire at the inner surface of the inner liner portion of a tire tread or between the belt portion and the inner liner portion of the tire;
   a wheel speed sensor for detecting the wheel speed of the tire;
   contact time detection means for detecting the contact time of the tire based on the temporal waveform of the amount of deformation of the tire detected by the tire deformation amount measuring means, the temporal waveform of a differential value obtained by time differentiating the amount of deformation, or the temporal waveform of an integrated value obtained by time integrating the amount of deformation;
   contact length index calculating means for calculating the indices of contact length from the contact time and the wheel speed detected by the wheel speed sensor;
   means of calculating the ratio of the indices of contact length;
   memory means for storing a map showing the relationship between the ratio of the indices of contact length and lateral force; and
   lateral force estimation means for estimating lateral force generated in the tire by using the ratio of the indices of contact length and the map.

51. An estimation apparatus of a tire dynamic state amount comprising;
   tire deformation amount detection means for measuring the amount of deformation of the tire, installed at two or more positions on almost the same cross-section in the radial direction of the tire at the inner surface of the inner liner portion of a tire tread or between the belt portion and the inner liner portion of the tire;
   a wheel speed sensor for detecting the wheel speed of the tire;
   means of detecting the time between deformation points outside the contact patch of the tire based on the temporal waveform of the amount of deformation of the tire detected by the tire deformation amount measuring means, the temporal waveform of a differential value obtained by time differentiating the amount of deformation, or the temporal waveform of an integrated value obtained by time integrating the amount of deformation to calculate the indices of deformation length outside the contact patch by multiplying the detected time between deformation points outside the contact patch by the wheel speed;
   means of calculating the ratio of the indices of deformation length outside the contact patch;
   memory means for storing a map showing the relationship between the ratio of the indices of deformation length outside the contact patch and the ratio of the indices of contact length and the camber angle and a correction map for compensating lateral force according to the camber angle; and lateral force estimation means for estimating lateral force generated in the tire by using the ratio of the indices of deformation length outside the contact patch, the ratio of the indices of contact length and the maps.

52. An estimation apparatus of a tire dynamic state amount comprising;

tire deformation amount detection means for measuring the amount of deformation of the tire, installed at two or more positions on almost the same cross-section in the radial direction of the tire at the inner surface of the inner liner portion of a tire tread or between the belt portion and the inner liner portion of the tire;

a wheel speed sensor for detecting the wheel speed of the tire;

contact time detection means for detecting the contact time of the tire based on the temporal waveform of the amount of deformation of the tire detected by the tire deformation amount measuring means, the temporal waveform of a differential value obtained by time differentiating the amount of deformation, or the temporal waveform of an integrated value obtained by time integrating the amount of deformation;

contact length index calculating means for calculating the indices of contact length from the contact time and the wheel speed detected by the wheel speed sensor;

means of calculating the difference between the indices of contact length;

memory means for storing a map showing the relationship between the difference between the indices of contact length and lateral force; and lateral force estimation means for estimating lateral force generated in the tire by using the difference between the indices of contact length and the map.

53. An estimation apparatus of a tire dynamic state amount comprising;

tire deformation amount detection means for measuring the amount of deformation of the tire, installed at two or more positions on almost the same cross-section in the radial direction of the tire at the inner surface of the inner liner portion of a tire tread or between the belt portion and the inner liner portion of the tire;

a wheel speed sensor for detecting the wheel speed of the tire;

contact time detection means for detecting the contact time of the tire based on the temporal waveform of the amount of deformation of the tire detected by the tire deformation amount measuring means, the temporal waveform of a differential value obtained by time differentiating the amount of deformation, or the temporal waveform of an integrated value obtained by time integrating the amount of deformation;

contact length index calculating means for calculating the indices of contact length from the contact time and the wheel speed detected by the wheel speed sensor;

means of calculating the average value of the indices of contact length;

memory means for storing a map showing the relationship between the average value of the indices of contact length and load;

load estimation means for estimating a load applied to the tire by using the average value of the indices of contact length and the map; and compensation means for compensating the estimated value of the load by lateral force estimated by the tire dynamic state amount estimation apparatus of claim 52.

54. An estimation apparatus of a tire dynamic state amount comprising;

tire deformation amount detection means for measuring the amount of deformation of the tire, installed at two or more positions on almost the same cross-section in the radial direction of the tire at the inner surface of the inner liner portion of a tire tread or between the belt portion and the inner liner portion of the tire;

a wheel speed sensor for detecting the wheel speed of the tire;

means of detecting the amount of deformation at deformation points outside the contact patch of the tire based on the temporal waveform of the amount of deformation of the tire detected by the tire deformation amount measuring means, the temporal waveform of a differential value obtained by time differentiating the amount of deformation, or the temporal waveform of an integrated value obtained by time integrating the amount of deformation;

means of calculating the ratio of the amounts of deformation at deformation points outside the contact patch, which are located before and after the contact patch;

memory means for storing a map showing the relationship between the ratio of the amounts of deformation at deformation points outside the contact patch and longitudinal force; and longitudinal force estimation means for estimating longitudinal forced applied to the tire by using the amount of deformation at deformation points outside the contact patch and the map.

55. An estimation apparatus of a tire dynamic state amount comprising;

tire deformation amount detection means for measuring the amount of deformation of the tire, installed at two or more positions on almost the same cross-section in the radial direction of the tire at the inner surface of the inner liner portion of a tire tread or between the belt portion and the inner liner portion of the tire;

a wheel speed sensor for detecting the wheel speed of the tire;

means of detecting the time between a deformation point outside the contact patch on the leading edge side of the tire and the contact end on the leading edge side based on the temporal waveform of the amount of deformation of the tire detected by the tire deformation amount measuring means, the temporal waveform of a differential value obtained by time differentiating the amount of deformation, or the temporal waveform of an integrated value obtained by time integrating the amount of deformation;

means of detecting the time between a deformation point outside the contact patch on the trailing edge side of the tire and the contact end on the trailing edge side;

means of calculating the length of deformation on the leading edge side and the length of deformation on the trailing edge side by multiplying the time between the deformation point outside the contact patch on the leading edge side of the tire and the contact end on the leading edge side and the time between the deformation point outside the contact patch on the trailing edge side of the tire and the contact end on the trailing edge side by the wheel speed detected by the wheel speed sensor, respectively, to compute the ratio of the length of deformation on the leading edge side to the length of deformation on the trailing edge side;

memory means for storing a map showing the relationship between the ratio of the length of deformation on the leading edge side to the length of deformation on the trailing edge side and longitudinal force; and longitudinal force estimation means for estimating longitudinal force applied to the tire by using the ratio of the length of deformation on the leading edge side to the length of deformation on the trailing edge side and the map.

56. The estimation apparatus of a tire dynamic state amount according to claim 48, further comprising either one or both of a pressure sensor for measuring the inside pressure of the tire and a temperature sensor for measuring the inside temperature of the tire, and communication means for transmitting the amount of deformation of the tire measured by the tire deformation amount measuring means and either one or both of the measured values of the inside pressure and inside temperature of the tire to the car body side.

57. The estimation apparatus of a tire dynamic state amount according to claim 56, wherein the communication means comprises means of generating a power voltage by it receiving a radio wave transmitted from the car body side.

58. The tire dynamic state amount estimation apparatus according to claim 56, further comprising a power generator for generating power by the rotating of the tire.

* * * * *